United States Patent
Kishi et al.

(10) Patent No.: US 9,100,611 B2
(45) Date of Patent: Aug. 4, 2015

(54) IMAGE FORMING APPARATUS, METHOD, AND PROGRAM PRODUCT ADJUSTING IMAGE FORMATION BASED ON READING CROSS-HAIR AT FOLDED CORNER OF PRINT MEDIUM

(71) Applicants: Yumiko Kishi, Kanagawa (JP); Makoto Hino, Kanagawa (JP)

(72) Inventors: Yumiko Kishi, Kanagawa (JP); Makoto Hino, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/474,455

(22) Filed: Sep. 2, 2014

(65) Prior Publication Data

US 2015/0070732 A1  Mar. 12, 2015

(30) Foreign Application Priority Data

Sep. 12, 2013  (JP) ................... 2013-189782

(51) Int. Cl.
*H04N 1/387* (2006.01)
*G06K 15/02* (2006.01)
*H04N 1/409* (2006.01)
*H04N 1/00* (2006.01)
*G03G 15/00* (2006.01)

(52) U.S. Cl.
CPC ......... *H04N 1/4092* (2013.01); *G03G 15/5062* (2013.01); *H04N 1/00734* (2013.01); *H04N 1/00748* (2013.01); *G03G 15/6582* (2013.01); *G03G 2215/00569* (2013.01); *H04N 2201/04717* (2013.01)

(58) Field of Classification Search
None
See application file for complete search history.

(56) References Cited

U.S. PATENT DOCUMENTS

| 5,323,473 | A  | * | 6/1994  | Lau ........................ 382/287 |
| 7,760,370 | B2 | * | 7/2010  | Oki ........................ 358/1.12 |
| 8,223,386 | B2 | * | 7/2012  | Oyama et al. ......... 358/1.18 |
| 8,599,429 | B2 | * | 12/2013 | Sakuraba ............... 358/1.18 |
| 8,705,068 | B2 | * | 4/2014  | Hine et al. ............. 358/1.18 |
| 8,964,241 | B2 | * | 2/2015  | Mizuguchi ............. 358/1.18 |
| 2003/0133000 | A1 |  | 7/2003 | Conrow et al. |
| 2008/0019727 | A1 |  | 1/2008 | Honma |
| 2009/0168109 | A1 |  | 7/2009 | Kishi |
| 2014/0072201 | A1 | * | 3/2014 | Tilt ......................... 382/321 |
| 2014/0368851 | A1 | * | 12/2014 | Saito ...................... 358/1.13 |

FOREIGN PATENT DOCUMENTS

| EP | 1 613 052 A2 | 1/2006 |
| JP | 8-115011 | 5/1996 |
| JP | 2005-026835 | 1/2005 |
| JP | 2006-005487 | 1/2006 |
| JP | 2006-011285 | 1/2006 |
| JP | 2010-160611 A | 7/2010 |
| JP | 2012-006349 | 1/2012 |

OTHER PUBLICATIONS

Extended European Search Report issued Apr. 16, 2015 in Patent Application No. 14180906.1.

* cited by examiner

*Primary Examiner* — Scott A Rogers
(74) *Attorney, Agent, or Firm* — Oblon, McClelland, Maier & Neustadt, L.L.P.

(57) ABSTRACT

A non-transitory computer-readable storage medium stores image data for adjustment of image formation. The image data includes a cross-hair formed in a corner of a recording medium, and a corner edge detection mark formed to detect a folded corner edge of the recording medium from read data obtained when the corner of the recording medium including an area where the cross-hair is formed on one side is folded to an opposite side to the one side of the recording medium and an image reader reads the opposite side.

13 Claims, 19 Drawing Sheets

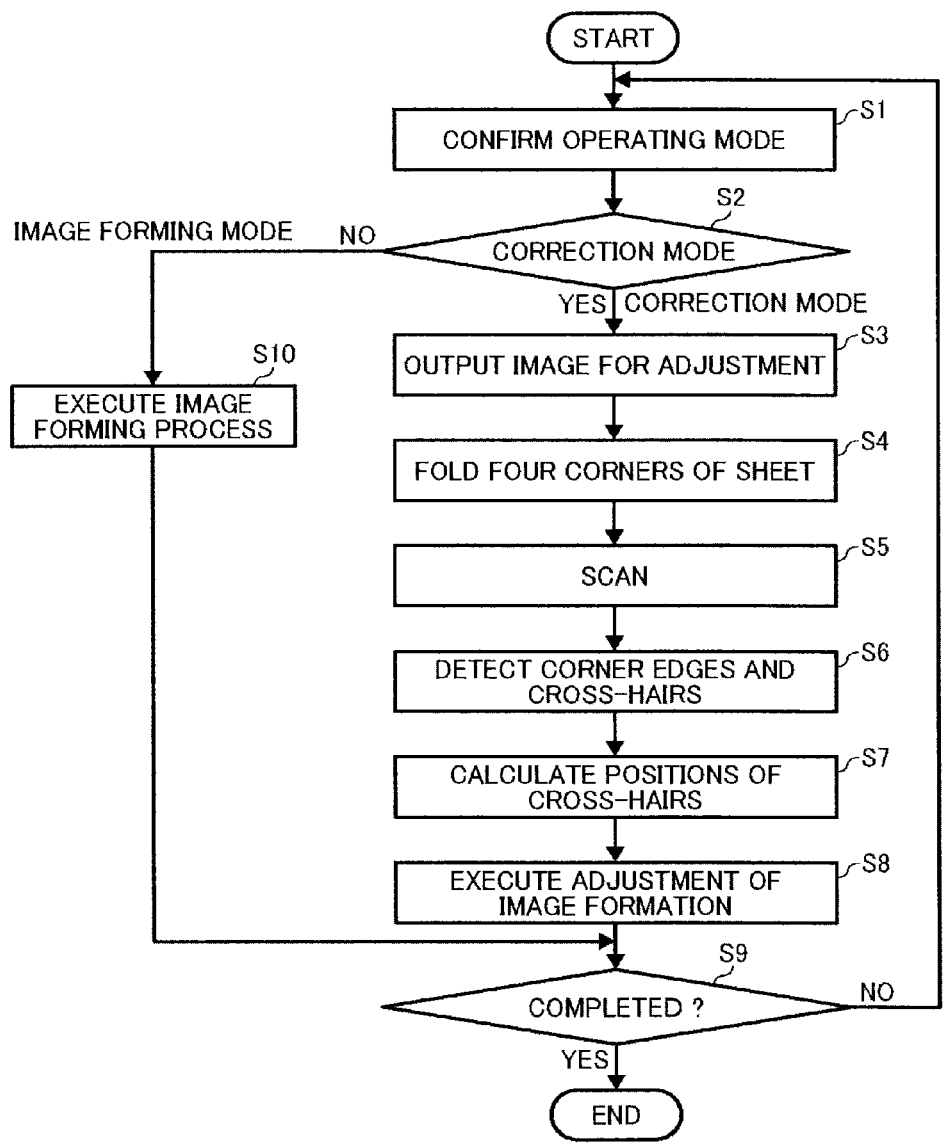

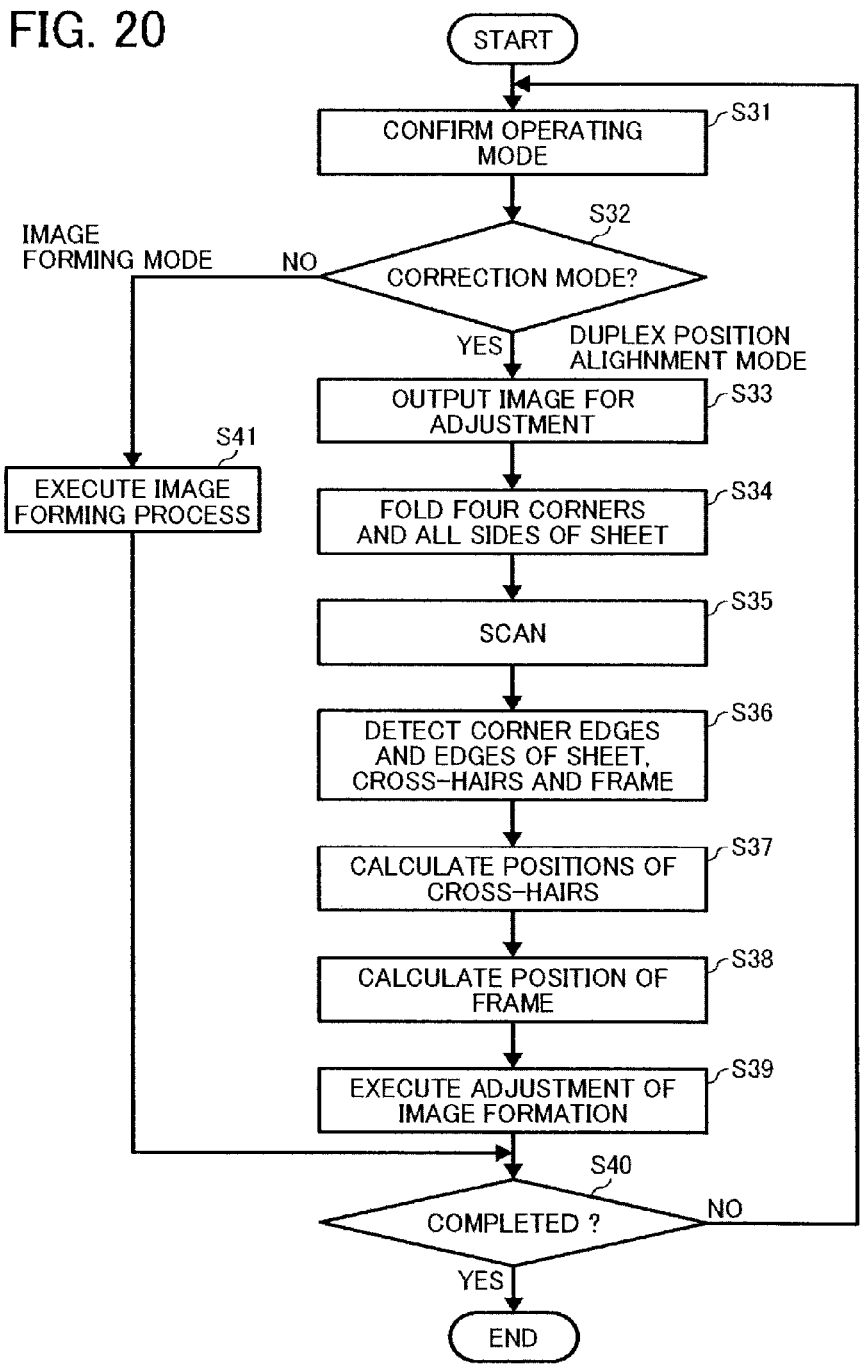

IMAGE FORMING APPARATUS, METHOD, AND PROGRAM PRODUCT ADJUSTING IMAGE FORMATION BASED ON READING CROSS-HAIR AT FOLDED CORNER OF PRINT MEDIUM

CROSS-REFERENCE TO RELATED APPLICATION

This patent application is based on and claims priority pursuant to 35 U.S.C. §119(a) to Japanese Patent Application No. 2013-189782, filed on Sep. 12, 2013, in the Japan Patent Office, the entire disclosure of which is hereby incorporated by reference herein.

BACKGROUND

1. Technical Field

Embodiments of the present invention generally relate to an image forming apparatus, a method of adjusting the image formation, and a storage medium storing image data for adjustment of image formation.

2. Background Art

Various types of electrophotographic image forming apparatuses are known, including copiers, printers, facsimile machines, or multifunction machines having two or more of copying, printing, scanning, facsimile, plotter, and other capabilities. Such image forming apparatuses usually form an image on a recording medium according to image data. Specifically, in such image forming apparatuses, for example, a charger uniformly charges a surface of a photoconductor serving as an image carrier. An optical writer irradiates the surface of the photoconductor thus charged with a light beam to form an electrostatic latent image on the surface of the photoconductor according to the image data. A development device supplies toner to the electrostatic latent image thus formed to render the electrostatic latent image visible as a toner image. The toner image is then transferred, directly or indirectly via an intermediate transfer belt onto a recording medium. Finally, a fixing device applies heat and pressure to the recording medium carrying the toner image to fix the toner image onto the recording medium. Thus, the image is formed on the recording medium.

SUMMARY

In one embodiment of the present invention, there is provided an improved non-transitory computer-readable storage medium storing image data for adjustment of image formation. The image data includes a cross-hair formed in a corner of a recording medium, and a corner edge detection mark formed to detect a folded corner edge of the recording medium from read data obtained when the corner of the recording medium including an area where the cross-hair is formed on one side is folded to an opposite side to the one side of the recording medium and an image reader reads the opposite side.

Also described is an improved image forming apparatus that includes an image forming device, an image reader, a non-transitory computer-readable storage medium, and an adjuster. The image forming device forms an image on a recording medium. The image reader reads an image from a recording medium. The non-transitory computer-readable storage medium stores image data for adjustment of image formation. The image data includes a cross-hair formed in a corner of a recording medium. The adjuster reads the image data from the non-transitory computer-readable storage medium, forms an image for adjustment of image formation on a recording medium with the image forming device, reads the image for adjustment of image formation from the recording medium with the image reader, and adjusts image formation according to read data provided by the image reader. When the corner of the recording medium including an area where the cross-hair is formed on one side is folded to an opposite side to the one side of the recording medium, the adjuster reads the opposite side with the image reader, detects the cross-hair and a corner edge of the recording medium from read data provided by the image reader, calculates a distance between the cross-hair and the corner edge of the recording medium, and adjusts the image formation according to the distance between the cross-hair and the corner edge of the recording medium.

Also described is an improved method of adjusting image formation of an image forming apparatus that includes forming a cross-hair in a corner of a recording medium, folding the corner of the recording medium including an area where the cross-hair is formed on one side, to an opposite side to the one side of the recording medium, reading the opposite side with an image reader, detecting the cross-hair and a corner edge of the recording medium according to read data provided by the image reader to calculate a distance between the cross-hair and the corner edge of the recording medium, and adjusting image formation of the image forming apparatus according to the distance between the cross-hair and the corner edge of the recording medium.

BRIEF DESCRIPTION OF THE DRAWINGS

A more complete appreciation of the present invention and many of the attendant advantages thereof will be more readily obtained as the same becomes better understood by reference to the following detailed description of embodiments when considered in connection with the accompanying drawings, wherein:

FIG. 5 is a flowchart of a control process of adjustment of image formation;

FIG. 20 is a flowchart of a control process of adjustment of image formation according to the second variation;

Figure 1:
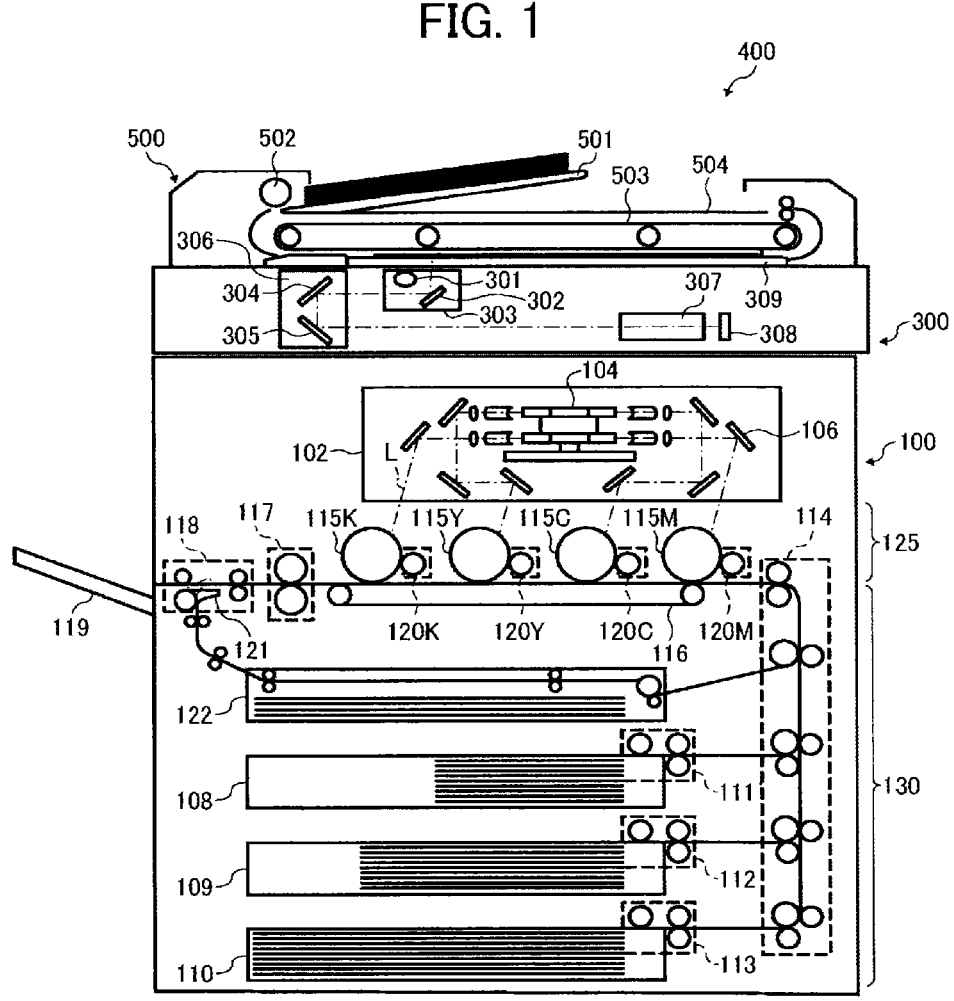
FIG. 1 is a schematic view of an image forming apparatus according to an embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the present invention of this patent specification is not intended to be limited to the specific terminology so selected and it is to be understood that each specific element includes all technical equivalents that have the same function, operate in a similar manner, and achieve similar results.

Although the embodiments are described with technical limitations with reference to the attached drawings, such description is not intended to limit the scope of the invention and all of the components or elements described in the embodiments of the present invention are not necessarily indispensable to the present invention.

In a later-described comparative example, embodiment, and exemplary variation, for the sake of simplicity like reference numerals are given to identical or corresponding constituent elements such as parts and materials having the same functions, and redundant descriptions thereof are omitted unless otherwise required.

Referring now to the drawings, wherein like reference numerals designate identical or corresponding parts throughout the several views, embodiments of the present invention are described below.

Initially with reference to FIG. 1, a description is given of a configuration and operation of an image forming apparatus 400 according to an embodiment of the present invention.

FIG. 1 is a schematic view of the image forming apparatus 400.

As illustrated in FIG. 1, the image forming apparatus 400 includes an automatic document feeder (ADF) 500 to automatically convey an original loaded thereon, a scanner 300 serving as an image reader to read the original, and a printer 100 to form a toner image.

The printer 100 includes a writer 102, an imaging unit 125, and a transfer and fixing unit 130. The writer 102 includes optical components such as a polygon mirror 104 and a reflection mirror 106. The imaging unit 125 includes, e.g., photoconductive drums 115 and development devices 120. The transfer and fixing unit 130 includes, e.g., a conveyor belt 116 and a fixing device 117.

Figure 11:
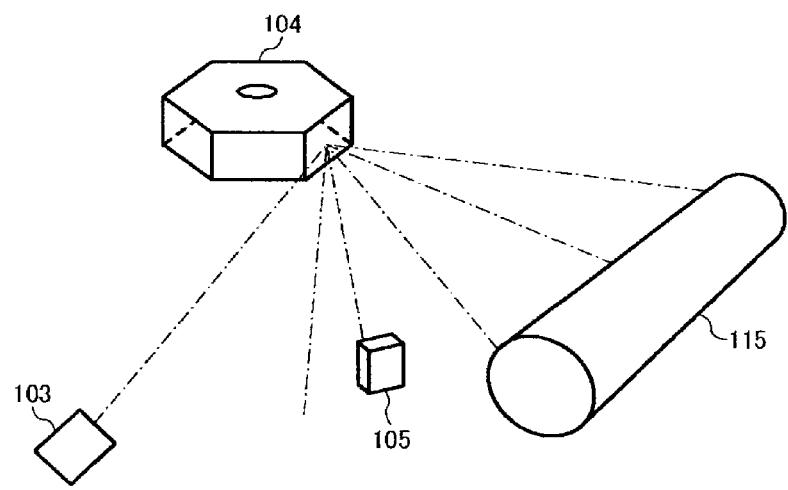
FIG. 11 is a schematic view of a writer with a photoconductive drum incorporated in the image forming apparatus of FIG. 1.

The writer 102 further includes a laser output unit 103, which is illustrated in FIG. 11, to emit a light beam L. The light beam L emitted from the laser output unit 103 is condensed by a cylindrical lens and deflected by the polygon mirror 104 toward the reflection mirror 106. The light beam L is directed to each of the photoconductive drums 115K, 115Y, 115C, and 115M (hereinafter collectively referred to as photoconductive drums 115) via a corresponding imaging lens to form an electrostatic latent image thereon.

The electrostatic latent images thus formed are conveyed to the development devices 120K, 120Y, 120C, and 120M (hereinafter referred to as development devices 120) as the photoconductive drums 115 rotate, respectively. The development devices 120 develop the electrostatic latent images with developers of the respective colors to form visible toner images on the photoconductive drums 115. The photoconductive drums 115 rotate while carrying the toner images, and thus convey the toner images to the transfer and fixing unit 130. The transfer and fixing unit 130 includes trays 108, 109 and 110, feed units 111, 112, and 113, and a vertical conveyance unit 114 in addition to the conveyor belt 116 and the fixing device 117. Each of the trays 108 through 110 accommodates sheets P such as sheets of fine paper or plastic sheets. The feed units 111 through 113 feed the sheets P from the respective trays 108 through 110 one by one to the vertical conveyance unit 114. The vertical conveyance unit 114 conveys a sheet P fed by one of the feed units 111 through 113 to a position where the sheet P contacts the closest photoconductive drum, in this case, the photoconductive drum 115M.

The sheet P thus conveyed is then electrostatically attached to the conveyor belt 116. The toner images are transferred onto the sheet P from the respective photoconductive drums 115 at a transfer bias potential to form a color toner image thereon. The sheet P carrying the color toner image is then conveyed to the fixing device 117. The fixing device 117 includes, e.g., a fixing member such as a fixing roller including silicon rubber or fluororubber. In the fixing device 117, the color toner image is fixed onto the sheet P under heat and pressure to form a color image thereon. During the fixing operation, the sheet P may be slightly constricted from heat.

The sheet P is then conveyed to a discharge unit 118, which discharges the sheet P onto a discharge tray 119. The discharge unit 118 includes a separation claw 121 to direct the sheet P to a duplex unit 122. Upon duplex printing, the discharge unit 118 does not discharge the sheet P onto the discharge tray 119, but directs the sheet P to the duplex unit 122 with the separation claw 121 in a tilted position. The sheet P conveyed to the duplex unit 122 is fed to the vertical conveyance unit 114 to consequently carry another image on the other side. After passing through the fixing operation, the sheet P carrying images on both sides reaches the discharge unit 118, which discharges the sheet P onto the discharge tray 119 with the separation claw 121 in a flat position.

The ADF 500 is disposed atop the scanner 300 and includes a platen 501, a separation and feed roller 502, an original conveyor belt 503, and an original discharge tray 504.

When the ADF 500 receives an instruction to start scanning originals placed on the platen 501, the separation and feed roller 502 feeds the originals one by one from the platen 501 to the original conveyor belt 503. The original conveyor belt 503 guides the originals onto a contact glass 309 where each of the originals temporally stops.

The scanner 300 scans image data of the original temporally stopping on the contact glass 309. Thereafter, the original conveyor belt 503 resumes conveyance of the original to discharge the original onto the original discharge tray 504.

Figure 2:
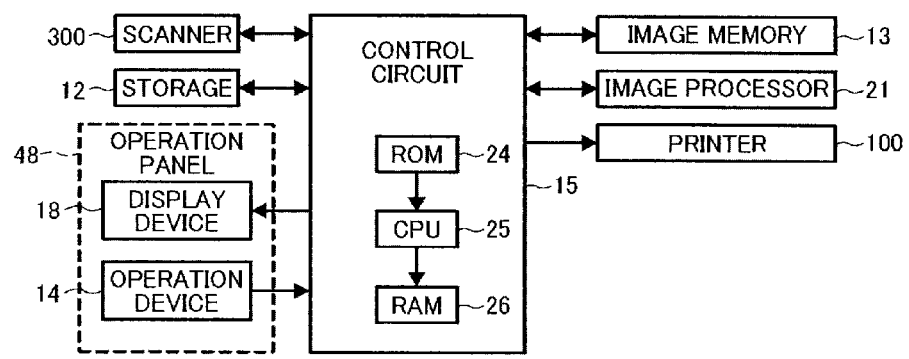
FIG. 2 is a block diagram of a control system of the image forming apparatus of FIG. 1.

In addition to the contact glass 309, the scanner 300 includes a first carrier 303, a light source 301 and a mirror 302 provided on the first carrier 303, a second carrier 306, mirrors 304 and 305 provided on the second carrier 306, a lens 307, and a charge coupled device (CCD) 308. The light source 301 is lighted when the ADF 500 conveys the original onto the contact glass 309 or when a user places an original on the contact glass 309 and directs the image forming apparatus 400 to start copying via an operation panel 48, which is illustrated in FIG. 2. In the meantime, the first carrier 303 and the second carrier 306 are moved along a guide rail.

The light source 301 emits light to the original positioned on the contact glass 309. Reflection light from the original is guided to the CCD 308 via the mirror 302, the mirrors 304 and 305, and the lens 307. The CCD 308 receives the reflection light and reads the image data of the original. The image data is converted from analog to digital data by an analog-to-digital (A/D) converter. The image data is then transmitted to a controller of the printer 100 from a data output unit.

In the printer 100, the writer 102 forms the electrostatic latent images on the respective photoconductive drums 115 according to the image data obtained from the scanner 300.

FIG. 2 is a block diagram of a control system of the image forming apparatus 400 described above.

As illustrated in FIG. 2, the image forming apparatus 400 includes a control circuit 15. The control circuit 15 is connected to, e.g., the scanner 300, a storage 12, an image memory 13, an image processor 21, the printer 100, an operation device 14 and a display device 18. The operation device 14 and the display device 18 constitute the operation panel 48.

With the operation device 14, the image forming apparatus is set to an image forming mode or a correction mode. The operation device 14 is also used to set image forming conditions. The display device 18 displays the image forming conditions selected through the operation device 14.

The control circuit 15 includes a read-only memory (ROM) 24, a central processing unit (CPU) 25, and a random access memory (RAM) 26. The ROM 24 accommodates system program data for controlling the entire image forming apparatus 400. The RAM 26 is used as a working memory. For example, the RAM 26 temporally stores, e.g., scan data (or read data) of an image for adjustment and a control command. When the power is turned on, in this example, the CPU 25 reads the system program data from the ROM 24 to initialize a system, thereby controlling the entire image forming apparatus 400 according to operation data from the operation device 14.

The storage 12 is a non-volatile memory such as an electrically erasable programmable read-only memory (EEPROM) to store a program for executing the correction mode. The CPU 25 reads and executes the program. The storage 12 also stores image data for adjustment of image formation, which is read by the CPU 25 to form an image for adjustment on, e.g., a sheet P, as described later.

According to the present embodiment, the printer 100 can form an image on the sheet P larger than a maximum size of sheet P that the scanner 300 can scan. In short, a maximum paper size that the printer can handle is larger than a maximum scan size. Specifically, the maximum scan size is A3 and the maximum paper size is A3 wide.

Figure 3:
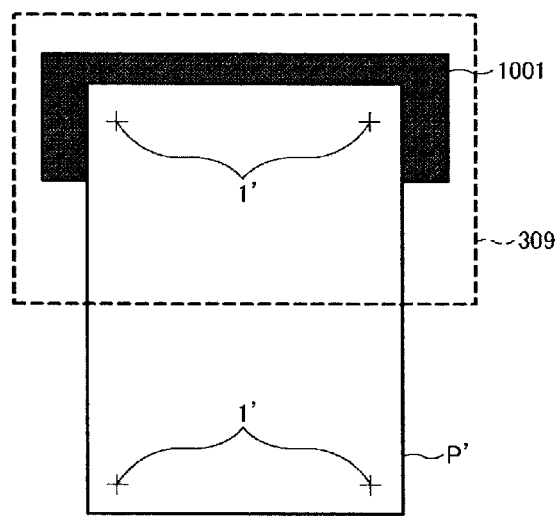
FIG. 3 is a diagram illustrating a comparative example of scanning an image for adjustment.

Referring now to FIG. 3, a description is given of the correction mode for adjusting image formation. FIG. 3 is a diagram illustrating a comparative example of scanning an image for adjustment.

In some cases, the image forming apparatus 400 may form an image skewed on a sheet P' if the sheet P' is skewed and conveyed. To prevent such skewing, an operator operates the operation panel 48 to select the correction mode upon installing the image forming apparatus 400 to adjust at least one of a series of image forming processes including conveyance of the sheet P' to the imaging unit 125. If the operator sets the correction mode, image data for adjustment of image formation is read from the storage 12 and an image for adjustment is formed on the sheet P' according to the image data for adjustment of image formation. As illustrated in FIG. 3, the image for adjustment includes cross-hairs 1' formed in four corners of the sheet P', respectively. After the image for adjustment is formed on the sheet P', the image forming apparatus 400 displays, with the display device 18 of the operation panel 48, an instruction to place the sheet P' on the scanner 300 when the sheet P' is outputted. According to the instruction provided through the display device 18, the operator places the sheet P' carrying the image for adjustment on the scanner 300 to scan the sheet P' carrying the image for adjustment. After the scanner 300 scans sheet P' carrying the image for adjustment, the image forming apparatus 400 measures a positional relation between a corner of the sheet P' and the corresponding cross-hair 1' according to the scan data to calculate a difference between the measured position and a target position. According to the difference thus calculated, the image forming apparatus 400 executes image adjustment such as a skew correction described later.

To accurately detect the image skewed on the sheet P' (hereinafter referred to as image skew), an image for adjustment is preferably formed on a maximum size of sheet P' that the printer 100 can handle, because a longer distance between one end to the other of the sheet P' increases a difference between an cross-hair formed on one end of the sheet P' and an cross-hair formed on the other end of the sheet P'. However, if the image for adjustment is formed on the maximum size of sheet P' and the operator places the maximum size of sheet P' on the contact glass 309 of the scanner 300 in a normal manner, that is, with its width direction (horizontal direction) along a main scanning direction, the sheet P' partly protrudes from the contact glass 309. As a result, among both ends of the sheet P' in the width direction thereof, corners on one end of the sheet P' and the corresponding cross-hairs 1' cannot be detected. In short, image skew cannot be detected.

To detect the cross-hairs 1' formed on both ends of the sheet P' in the width direction thereof, as illustrated in FIG. 3, the sheet P' is rotated at 90 degrees from a position in which the sheet P' is placed in the normal manner. In other words, the sheet P' is placed with its width direction along a sub-scanning direction.

In addition, to detect the corners on both ends of the sheet P' in the width direction thereof from scan data of the scanner 300, the scanner 300 scans the sheet P' over which an auxiliary member 1001 is placed. The auxiliary member 1001 is longer than the sheet P' in the width direction thereof and has a higher density than the sheet P'. Thus, accurately detecting image skew accompanies use of the maximum size of sheet P' and the auxiliary member 1001.

However, some users may not use the maximum size of sheet P' and/or may not have an auxiliary member such as the auxiliary member 1001. Such users may have to prepare the maximum size of sheet P' and the auxiliary member to adjust image formation. Alternatively, operators may have to bring the maximum size of sheet P' and the auxiliary member to the users to adjust image formation. Thus, adjustment of image formation is complicated.

Generally, an original pressing board facing the contact glass 309 of the scanner 300 is white, which is the same color as the sheet P'. Accordingly, even if the sheet P' carrying the image for adjustment is smaller than the maximum scan size, detecting corners of the sheet P' from the scan data accompanies use of the auxiliary member 1001. In the comparative example, the scanner 300 scans the cross-hairs 1' formed on the sheet P' placed at a predetermined position of the scanner 300. An end position of the sheet P' placed at the predetermined position is presumed from paper size data. Positions of the end of the sheet P' and the corresponding cross-hair 1' are calculated according to the end position of the sheet P' thus presumed and the position of the cross-hair 1' thus scanned. However, if the sheet P' carrying the cross-hairs 1' is skewed from the predetermined position, the amount of skew of the sheet P' is detected as image skew. Accordingly, adjustment of image formation may not effectively correct an image position.

In the correction mode, cross-hairs 1' formed on both ends of the sheet P' in a longitudinal direction thereof, that is, a vertical direction are detected to detect and correct a vertical magnification error of an image in addition to image skew. If the sheet P' carrying the cross-hairs 1' is larger than the maximum scan size, firstly, cross-hairs 1' formed on one end of the sheet P' in the longitudinal direction thereof and the corresponding corners are scanned, as illustrated in FIG. 3. Then, the sheet P' is rotated at 180 degrees so that cross-hairs 1' formed on the other end of the sheet P' in the longitudinal direction thereof and the corresponding corners are scanned. Thus, detecting the four corners of the sheet P' and the cross-hairs 1' formed therein requires performing the scanning operation twice, thereby complicating adjustment of image formation.

The present embodiment simplifies such complicated adjustment of image formation by use of an image for adjustment.

Figure 4A:
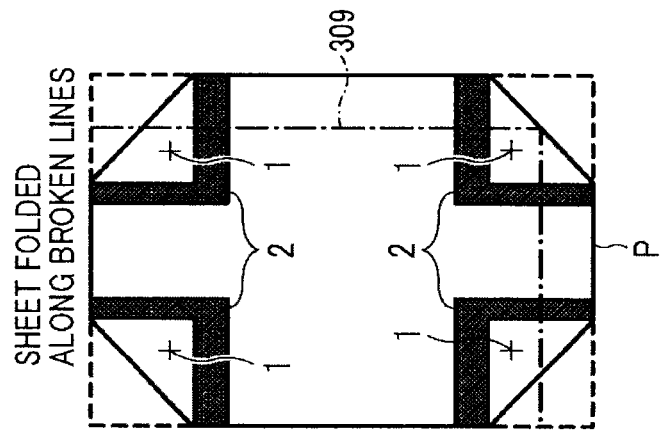
FIG. 4A is a plan view of a front side of a sheet illustrating an image for adjustment according to the embodiment of the present invention.
Figure 4B:
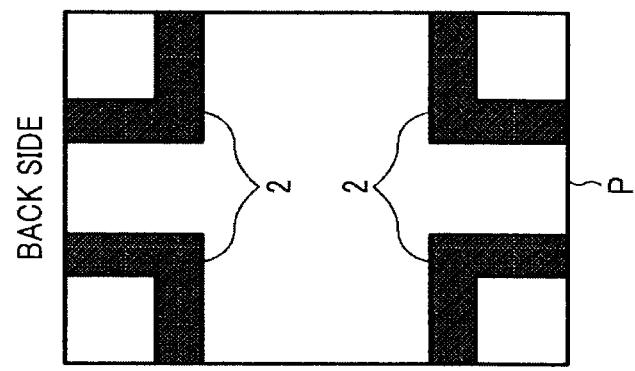
FIG. 4B is a plan view of a back side of the sheet illustrating another image for adjustment according to the embodiment of the present invention.
Figure 4C:
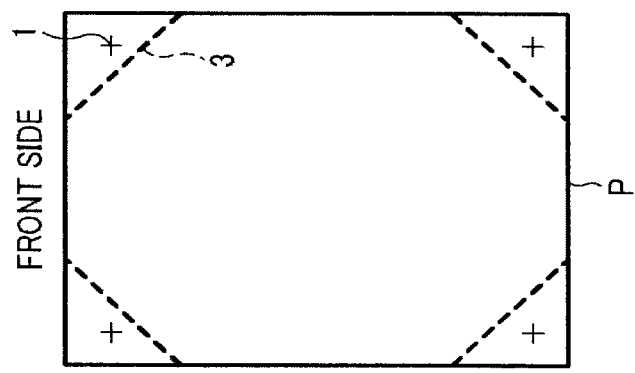
FIG. 4C is a plan view of the sheet illustrating a side to be scanned by a scanner.

Referring now to FIGS. 4A through 4C, a description is given of the image for adjustment according to the present embodiment.

FIG. 4A is a plan view of a front side of the sheet P illustrating an image for adjustment according to the present embodiment. FIG. 4B is a plan view of a back side of the sheet P illustrating another image for adjustment according to the present embodiment. FIG. 4C is a plan view of the sheet P illustrating a side to be scanned by the scanner 300.

As illustrated in FIG. 4A, the sheet P has four cross-hairs 1 and four folding lines 3 in four corners on the front side, respectively. As illustrated in FIG. 4B, the sheet P has four corner edge detection marks 2 on the back side to detect corner edges of the sheet P. Specifically, each of the four corner edge detection marks 2 is formed to detect ends in each of the four corners of the sheet P in the longitudinal and width directions thereof, respectively. As illustrated in FIG. 4C, the corner edges of the sheet P come over the corner edge detection marks 2 when the four corners are folded backward along the folding lines 3 such that areas including the respective cross-hairs 1 are within a scan area, that is, within the contact glass 309 of the scanner 300 indicated by a chain line. At this time, the corner edge detection marks 2 partly remain visible beyond the respective corner edges of the sheet P. The corner edge detection marks 2 may have any shapes, patterns and density as long as the ends of the sheet P in the width direction thereof and those in the longitudinal direction thereof can be detected. For example, the corner edge detection marks 2 may be solid images or halftone images. However, since a higher contrast between the sheet P and the corner edge detection marks 2 contributes to more accurate detection of ends of the sheet P, the corner edge detection marks 2 preferably have a certain level of density to ensure accurate detection of the edges of the sheet P. It is to be noted that the folding lines 3 are formed to help an operator or user to fold the corners of the sheet P. Alternatively, the images for adjustment may omit the folding lines 3.

When the four corners of the sheet P are folded backward along the folding lines 3 as illustrated in FIG. 4C, the four corners of the sheet P and the cross-hairs 1 are located inward from their previous positions before the sheet P is folded. Accordingly, when the folded sheet P is set on the scanner 300, the four corner edges of the sheet P and the cross-hairs 1 are within the scan area of the scanner 300 even if the sheet P is larger than the maximum scan size. In addition, the corner edge detection marks 2 are not completely covered by the four corners of the sheet P folded, and thus partly remain visible, thereby generating a contrast between the corner edges of the sheet P and the corner edge detection marks 2. Accordingly, the cross-hairs 1 formed in the four corners of the sheet P and the corner edges of the sheet P can be scanned at once. In addition, the corner edges of the sheet P can be accurately detected from the scan data without using the auxiliary member 1001 illustrated in FIG. 3. Thus, adjustment of image formation can be simplified.

Moreover, since the corner edges of the sheet P and the cross-hairs 1 can be detected from the scan data, a distance between a corner edge of the sheet P and the corresponding cross-hair 1 can be measured and therefore accurately detected.

Referring now to FIG. 5, a description is given of a control process of adjustment of image formation. FIG. 5 is a flowchart of the control process of adjustment of image formation.

Firstly, the control circuit 15 confirms the operating mode of the image forming apparatus (S1). The image forming mode is the default mode. If the image forming mode is set (No in S2), the control circuit 15 executes a normal image forming process (S10). On the other hand, if the operator or user sets the correction mode through the operation panel 48 (Yes in S2), the control circuit 15 executes adjustment of image formation. It is to be noted that the correction mode is selected through a menu screen of the display device 18 and thus set.

Specifically, if the correction mode is set, the control circuit 15 controls the operation panel 48 to display a screen with the display device 18 that instructs the operator or user to input a paper size of the sheet P on which the images for adjustment are formed, a tray to use, or both. According to the instruction, the operator or user operates the operation device 14 of the operation panel 48 to input the paper size (e.g., A3), the tray that accommodates the sheet P, or both. Upon receiving paper size data, tray data, or both from the operation device 14, the control circuit 15 stores the paper size data, the tray data, or both in, e.g., the RAM 26. Then, the control circuit 15 outputs the images for adjustment according to the paper size data, the tray data, or both (S3). Alternatively, the images for adjustment may be outputted onto a predetermined size of paper only, or only a predetermined tray may be used to feed a sheet on which the images for adjustment are outputted, or both. For example, the maximum paper size (e.g., A3 wide) that the printer 100 can handle may be designated, and a bypass tray may be designated. In such a case, the display device 18 displays an instruction to set a predetermined size of sheet on the predetermined tray. According to the instruction, the operator or user sets the predetermined size of sheet on the predetermined tray and presses a start button on the operation device 14 to output the images for adjustment.

Now, a description is given of an output of the images for adjustment. Firstly, the control circuit 15 reads the image data for adjustment of image formation from the storage 12 to transmit the image data for adjustment of image formation and the paper size data stored in the RAM 26 to the image processor 21. The control circuit 21 generates output data for controlling ON/OFF of exposure of the writer 102 according to the image data for adjustment of image formation and the paper size data. The writer 102 is controlled according to the output data thus generated, and forms a latent image to be an image for adjustment illustrated in FIG. 4A or 4B on, e.g., the photoconductive drum 115K. Through the series of image forming processes described above, the sheet P carries the images for adjustment illustrated in FIGS. 4A and 4B on both sides and outputted from the image forming apparatus 400.

After the images for adjustment are outputted, the control circuit 15 displays, with the display device 18 of the operation panel 48, an instruction to fold the four corners of the sheet P along the folding lines 3 and set the folded sheet P on the scanner 300 (S4). According to the instruction displayed by the display device 18 of the operation panel 48, the operator or user folds the four corners of the sheet P carrying the images for adjustment, and sets the folded sheet P on the scanner 300. Then, the operator or user operates the display device 18 of the operation panel 48 to scan the folded sheet P carrying the images for adjustment (S5).

After the scanner 300 scans the folded sheet P carrying the images for adjustment, the control circuit 15 detects the cross-hairs 1 and the corner edges of the sheet P, that is, ends in each corner of the sheet P in the longitudinal direction thereof (sub-scanning direction) and in the width direction thereof (main scanning direction), respectively, according to scan data (S6). Then, the control circuit 15 calculates positions (coordinates) of the cross-hairs 1 (S7). If the control circuit 15 fails to detect the corner edges of the sheet P, the cross-hairs 1, or both from the scan data, the operator or user may have set the sheet P without folding it and scanned the unfolded sheet P. In such a case, for example, the control circuit 15 generates a warning sound or displays, with the display device 18 of the operation panel 48, the instruction to fold the four corners of the sheet P along the folding lines 3 and scan the folded sheet P, or both, thereby directing the operator or user to do so again.

Figure 6:
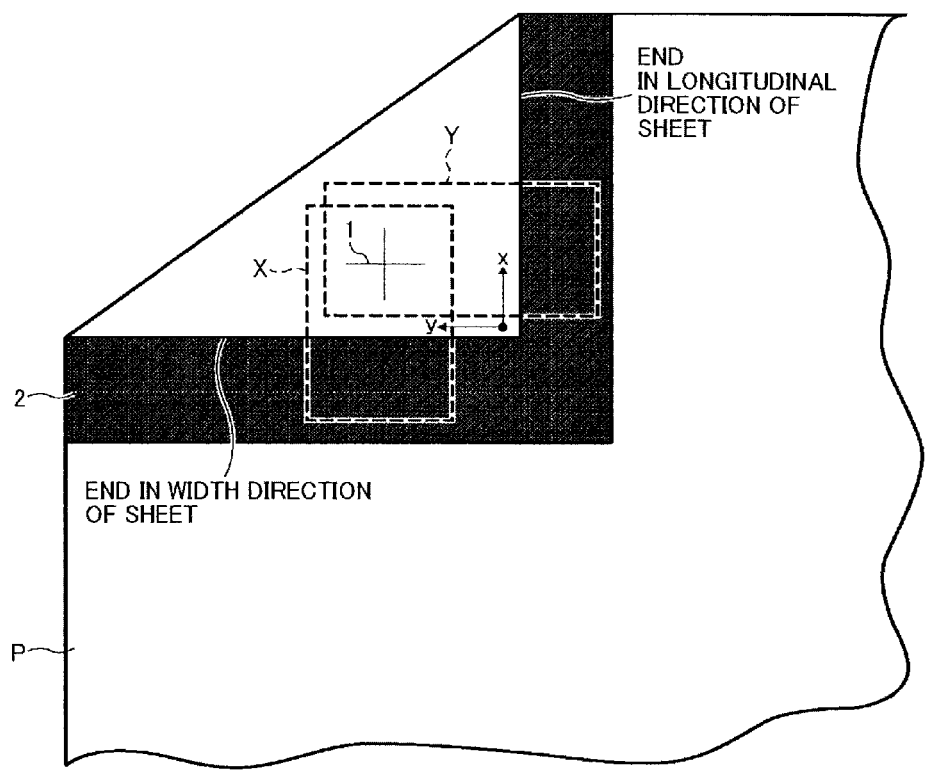
FIG. 6 is an enlarged view of the sheet of FIG. 4C illustrating a corner including an area where the image for adjustment is formed.
Figure 7:
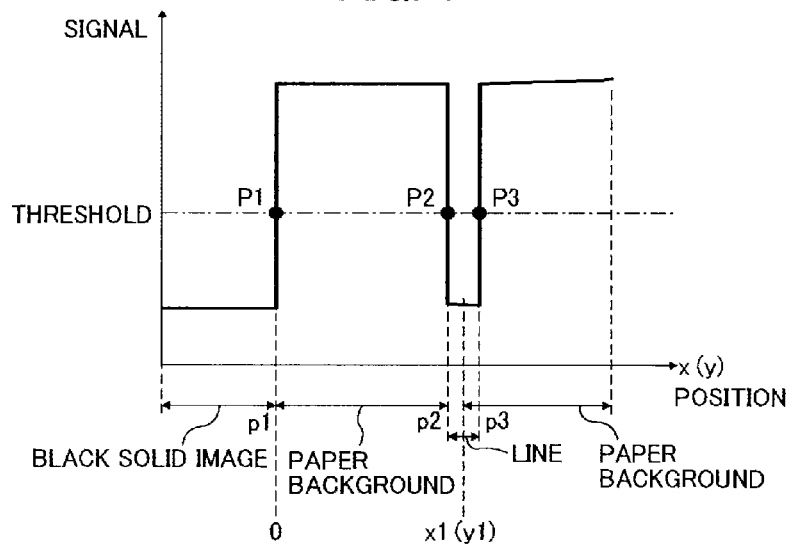
FIG. 7 is a diagram illustrating a one-dimensional signal in areas surrounded by broken lines in FIG. 6.

Referring now to FIGS. 6 and 7, a description is given of the detection of the cross-hairs 1 and the corner edges of the sheet P according to the scan data (S6) and the calculation of the positions (coordinates) of the cross-hairs 1 (S7).

FIG. 6 is an enlarged view of the sheet P of FIG. 4C illustrating a corner including an area where the image for adjustment is formed. FIG. 7 is a diagram illustrating a one-dimensional signal in areas surrounded by broken lines in FIG. 6.

The scan data includes the cross-hairs 1 formed in the four corners of the sheet P, respectively, the corner edges of the sheet P, that is, the ends in each corner in the main scanning and the sub-scanning directions, respectively, and the corner edge detection marks 2 visible in black outside the corner edges.

Each of areas X and Y of the scan data surrounded by broken lines in FIG. 6 is equalized in an edge direction of the sheet P to obtain the one-dimensional signal illustrated in FIG. 7.

The one-dimensional signal has a predetermined threshold. Intersections of the threshold and the one-dimensional signal are detected as an end P1, and edge positions P2 and P3 of a straight line of the cross-hair 1, respectively. The area X illustrated in FIG. 6 is analyzed to detect the cross-hair 1 and the end of the sheet P in the width direction thereof. The area Y illustrated in FIG. 6 is analyzed to detect the cross-hair 1 and the end of the sheet P in the longitudinal direction thereof.

A distance between the end P1 and a center of the cross-hair 1 is calculated by $|p1-(p2+p3)/2|$, where p1, p2, and p3 are positional data of P1, P2, and P3 detected from the scan data, respectively, as illustrated in FIG. 7. From the areas X and Y, coordinates (x1, y1) of an interception of the straight lines of the cross-hair 1 is calculated when the origin is the corner of the sheet P, that is, when the position of P1 is zero in both areas X and Y.

Coordinates of the other three cross-hairs 1 are calculated in this manner. Then, the control circuit 15 executes adjustment of image formation according to the coordinates of the cross-hairs 1 thus calculated (S8). According to the present embodiment, the control circuit 15 corrects, e.g., image skew and an image position as the adjustment of image formation.

Figure 8:
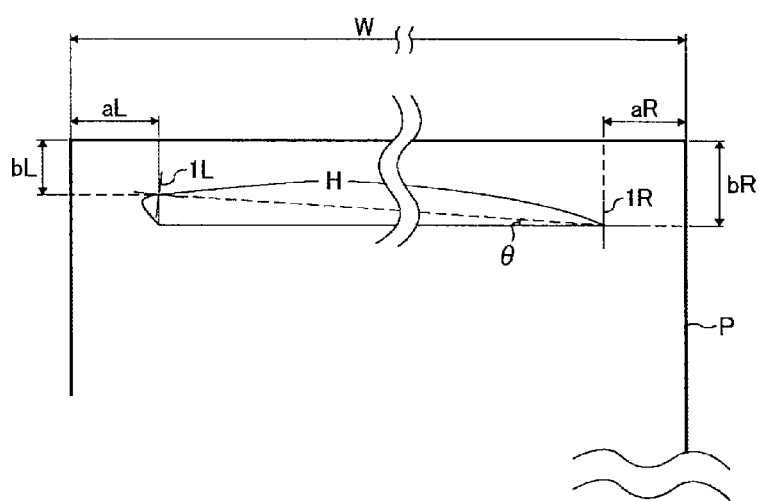
FIG. 8 is a partial view of the sheet for describing calculation of an amount of image skew.

Referring now to FIG. 8, a detailed description is given of the correction of image skew.

FIG. 8 is a partial view of the sheet P for describing calculation of an amount of image skew.

The amount of image skew is calculated using, among the coordinates of the cross-hairs 1 formed in the four corners of the sheet P, the coordinates of an cross-hair formed in one corner on a leading end of the sheet P in the width direction thereof (herein called an cross-hair 1L), and coordinates of an cross-hair formed in the other corner on the leading end of the sheet P (herein called an cross-hair 1R).

In FIG. 8, the coordinates of the cross-hair 1L are (x1, y1), where x1 is a distance aL and y1 is a distance bL, when the origin is the corner closest to the cross-hair 1L. On the other hand, the coordinates of the cross-hair 1R are (x1, y1), where x1 is a distance aR and y1 is a distance bR, when the origin is the corner closest to the cross-hair 1R. Image skew is expressed in an equation $\sin\theta = (bR-bL)/H$, where "$\theta$" represents a skew angle and "H" represents a distance between the cross-hairs 1L and 1R.

It is to be noted that the distance H between the cross-hairs 1L and 1R is expressed in an equation $H=\{(W-aR-aL)^2+(bR-bL)2\}^{1/2}$, where "W" represents a width of the sheet P.

The skew is corrected according to the amount of image skew calculated according to the coordinates of the cross-hairs 1L and 1R. Specifically, the image skew is corrected by changing an angle of a skew correction board 81 with respect to a direction in which the sheet P is conveyed. It is to be noted that the skew correction board 81 is provided near a pair of registration rollers 80 illustrated in FIG. 9.

Figure 9:
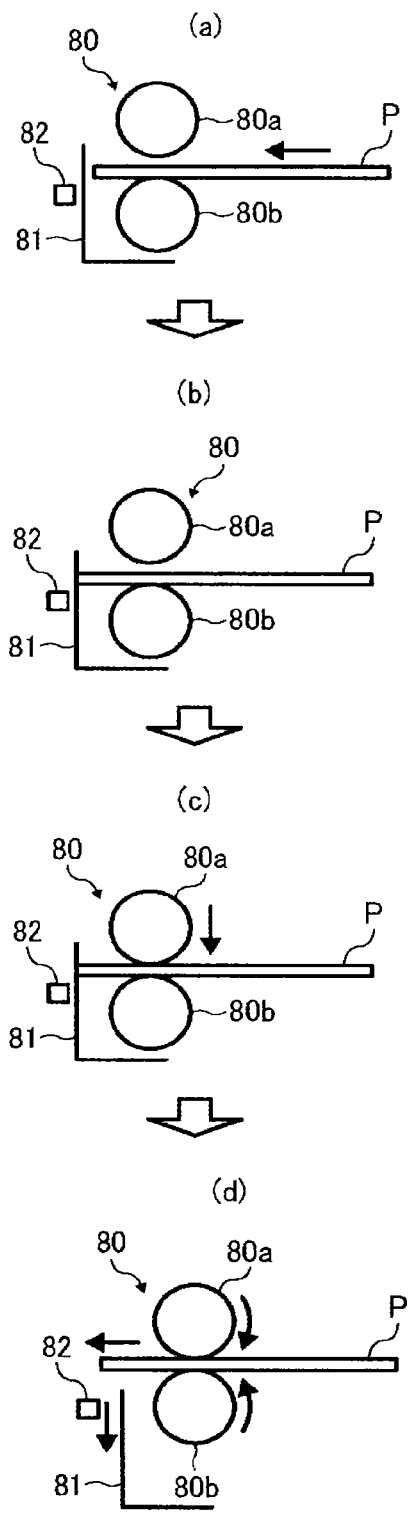
FIG. 9 is a diagram illustrating correction of a sheet skew using a skew correction board.

Referring now to FIG. 9, a description is given of correction of a sheet skew using the skew correction board 81.

FIG. 9 is a diagram illustrating the correction of a sheet skew using the skew correction board 81.

Usually, as illustrated in FIG. 9(a), an upper roller 80a of the pair of registration rollers 80 is separated from a lower roller 80b of the pair of registration rollers 80. As illustrated in FIG. 9(b), the leading end of the sheet P fed from one of the trays 108 through 110 hits against the skew correction board 81 and stops moving there. Accordingly, a skew of the sheet P is corrected. Then, as illustrated in FIG. 9(c), the upper roller 80a of the pair of registration rollers 80 descends to sandwich the sheet P between the upper roller 80a and the lower roller 80b of the pair of registration rollers 80. Then, as illustrated in FIG. 9(d), the skew correction board 81 is moved to allow the pair of registration rollers 80 to send the sheet P to the imaging unit 125. Accordingly, the sheet P of which the skew is corrected is conveyed straight to the imaging unit 125.

The image skew can be corrected by changing the angle of the skew correction board 81 with respect to the direction in which the sheet P is conveyed. The storage 12 stores a table correlating amounts of skew and amounts of adjustment of the skew correction board 81. The control circuit 15 reads the table from the storage 12 after the amount of skew is calculated. Then, the control circuit 15 determines an amount of adjustment of the skew correction board 81 according to the table, based on the calculated amount of skew, and displays, with the display device 18 of the operation panel 48, the amount of adjustment of the skew correction board 81 thus determined. According to the amount of adjustment of the skew correction board 81 displayed by the display device 18, the operator or user moves one end of the skew correction board 81 in a width direction thereof to change the angle of the skew correction board 81 with respect to the direction in which the sheet P is conveyed. Accordingly, the sheet P is conveyed straight to the imaging unit 125 and an image can be formed on the sheet P without a skew. Alternatively, an adjustment mechanism may be provided to automatically adjust the angle of the skew correction board 81 with respect to the direction in which the sheet P is conveyed according to the amount of adjustment of the skew correction board 81.

Figure 10:
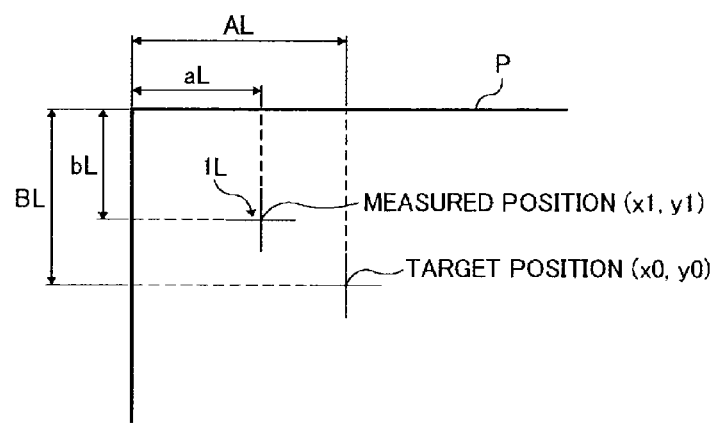
FIG. 10 is another partial view of the sheet illustrating a measured position and a target position.

Referring now to FIG. 10, a detailed description is given of the correction of an image position.

FIG. 10 is a partial view of the sheet P illustrating a measured position and a target position.

Correcting the image position starts with calculating a difference between the measured position and the target position. As illustrated in FIG. 10, coordinates of the target position of the cross-hair 1L are (x0, y0), where x0=AL and y0=BL. On the other hand, coordinates of the measured position of the cross-hair 1L are (x1, y1) where x1=aL and y1=bL. The origin of these coordinates is the corner of the sheet P closest to the cross-hair 1L. It is to be noted that the storage 12 preliminary stores the coordinates (x0, y0) of the target position. The control circuit 15 reads the coordinates (x0, y0) of the target position from the storage 12 to calculate the difference between the measured position and the target position of the cross-hair 1L as (x0-x1=AL-aL, y0-y1=BL-bL).

The cross-hair used to correct an image position can be any one of the cross-hairs 1 formed in the four corners of the sheet P. Preferably, a cross-hair located at a position where the writer 102 starts writing is used to correct an image position. According to the present embodiment, the cross-hair 1L is used to correct an image position, which is located on the leading end and on the left side of the sheet P and at the position where the writer 102 starts writing.

An image position is corrected by correcting writing control of the writer 102 according to the calculated difference. Specifically, the image position is corrected by adjusting a combination of count values of main scanning and sub-scanning counters and timing signals for writing image data at a desired position on, e.g., the photoconductive drum 115K as an electrostatic latent image.

Referring now to FIG. 11, a detailed description is given of the writing control of the writer 102.

FIG. 11 is a schematic view of the writer 102 with one of the photoconductive drums 115 incorporated in the image forming apparatus 400.

The writer 102 includes a synchronization sensor 105 to determine a writing timing in the main scanning direction. A light beam scanned by the polygon mirror 104 firstly enters the synchronization sensor 105. Upon detecting the light beam, the synchronization sensor 105 outputs a synchronization signal with respect to the main scanning direction (hereinafter simply referred to as main scanning sync signal). When synchronization in the main scanning direction is completed, the laser output unit 103 emits laser light according to the image data.

On the other hand, when a sheet sensor 82 provided near the pair of registration rollers 80 illustrated in FIG. 9 detects the leading end of the sheet P, the sheet sensor 82 outputs a synchronization signal with respect to the sub-scanning direction (hereinafter simply referred to as sub-scanning sync signal) to determine a writing timing in the sub-scanning direction. When synchronization in the sub-scanning direction is completed, the laser output unit 103 emits laser light according to the image data.

Figure 12:
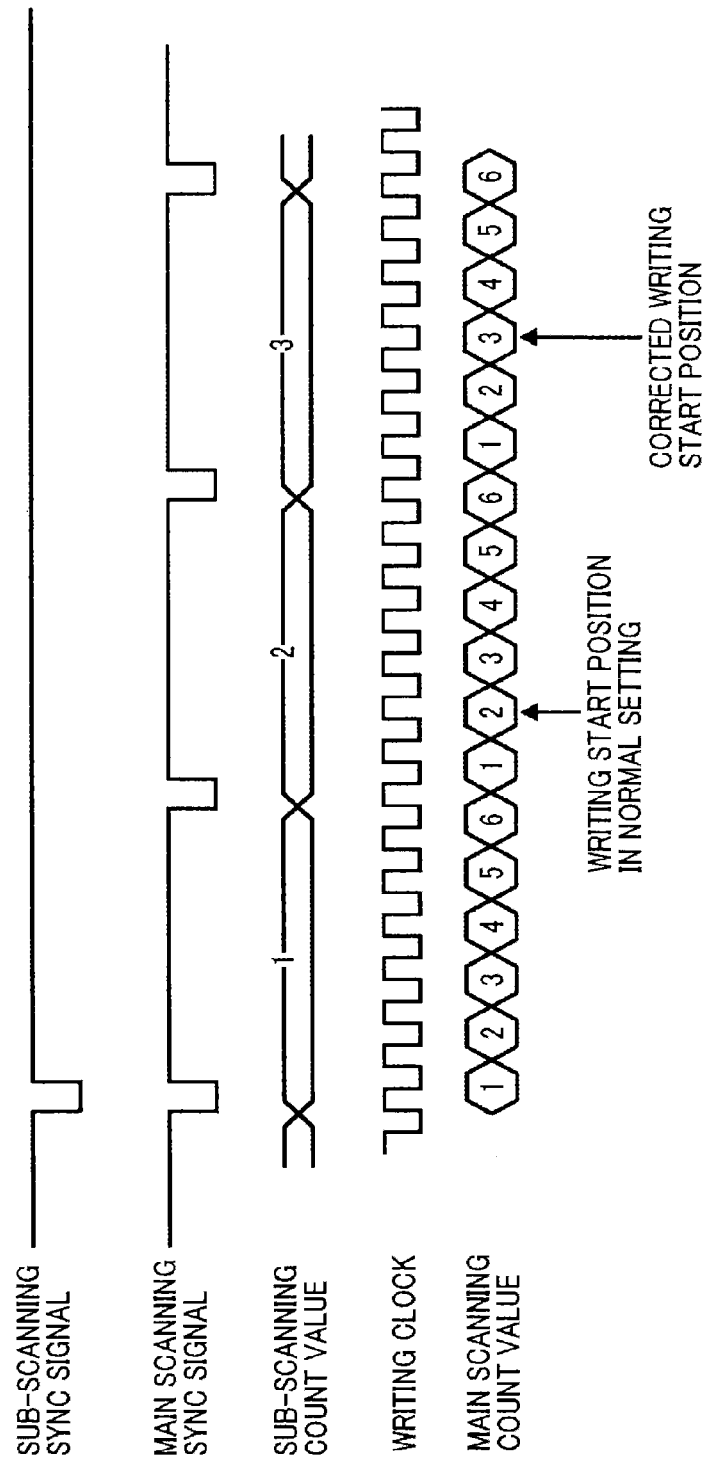
FIG. 12 is a diagram illustrating a correction of writing control.

Referring now to FIG. 12, a detailed description is given of the correction of writing control.

FIG. 12 is a diagram illustrating the correction of writing control.

In a normal writing start setting, for example, a writing start position is two counts from the sub-scanning sync signal and two counts from the main scanning sync signal. If it is detected from the scan data of the image for adjustment that the image for adjustment is shifted from the target position by one scanned line in the sub-scanning direction and by one dot in the main scanning direction, for example, the writing start position is corrected to be three counts from the sub-scanning sync signal and three counts from the main scanning sync signal. Accordingly, the image position is corrected and an image is formed at a target position.

Figure 13C:
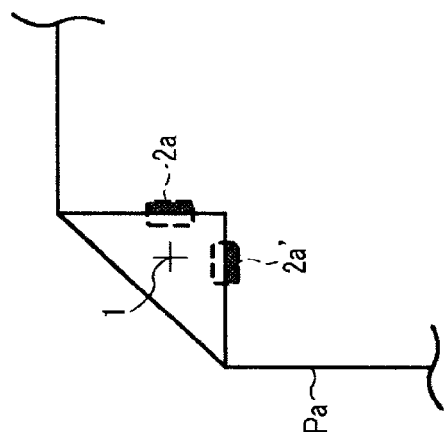
FIG. 13C is a partial view of a sheet illustrating a corner edge detection mark as a third variation.
Figure 13B:
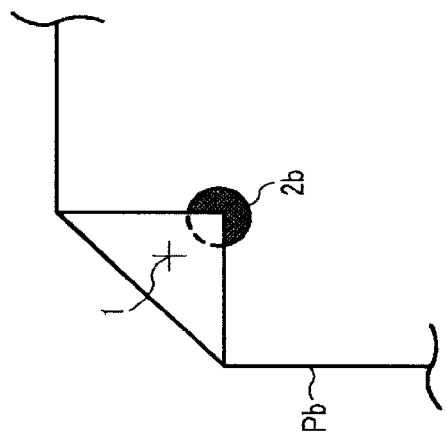
FIG. 13B is a partial view of a sheet illustrating a corner edge detection mark as a second variation.
Figure 13A:
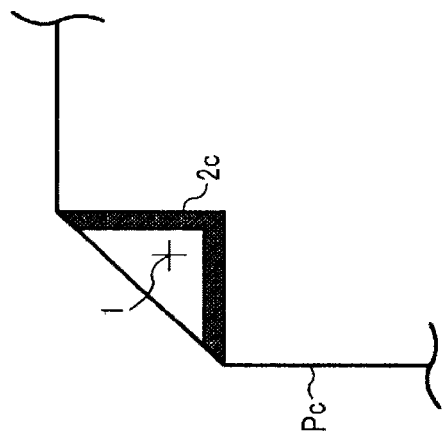
FIG. 13A is a partial view of a sheet illustrating corner edge detection marks as a first variation.

It is to be noted that the corner edge detection marks 2 may have any shape as long as the ends of the sheet P in the width direction thereof (main scanning direction) and in the longitudinal direction thereof (the sub-scanning direction) can be detected. For example, FIGS. 13A through 13C illustrates variations in the shape of the corner edge detection marks 2. Specifically, FIG. 13A is a partial view of a sheet Pa illustrating corner edge detection marks 2a and 2a' as a first variation.

FIG. 13B is a partial view of a sheet Pb illustrating a corner edge detection mark 2b as a second variation. FIG. 13C is a partial view of a sheet Pc illustrating a corner edge detection mark 2c as a third variation. In FIG. 13A, the corner edge detection mark 2a is partly visible beyond an end of the sheet Pa in a longitudinal direction thereof. The corner edge detection mark 2a' is partly visible beyond an end of the sheet Pa in a width direction thereof. In FIG. 13B, the corner edge detection mark 2b is partly visible beyond a corner of a sheet Pb. In FIG. 13C, the corner edge detection mark 2c is formed along ends of the sheet Pc on a front side, on which the cross-hair 1 is formed.

Alternatively, the cross-hairs 1 may be formed in four corners of a sheet for adjustment having front and back sides colored differently. In such a case, the four corners of the sheet for adjustment are folded backward including areas where the cross-hairs 1 are formed, thereby generating a contrast between the folded corners and the back side of the sheet for adjustment. Accordingly, ends of the sheet for adjustment and the cross-hairs 1 can be detected from scan data of the back side of the sheet for adjustment of which the four corners are folded backward.

Although a special sheet for adjustment is to be prepared, the adjustment is simplified compared to the above-described comparative example in which the auxiliary member 1001 and the sheet P' having the maximum size that the printer 100 can handle are prepared.

Referring now to FIGS. 14A through 17, a description is given of a first variation of the above-described embodiment.

Upon automatic duplex printing, an image formed on a front side of a sheet slightly shrinks during the fixing process, compared to that after transferred on the sheet, because the sheet slightly shrinks by being heated during the fixing process. As a result, even if an image to be formed on a back side of the sheet has the same magnification as the image formed on the front side of the sheet, the image formed on the back side of the sheet is consequently larger than the image formed on the front side of the sheet. In short, there is a magnification error between the images formed on the respective sides of the sheet. According to the first variation, such a magnification error is corrected in the correction mode.

Figure 14A:
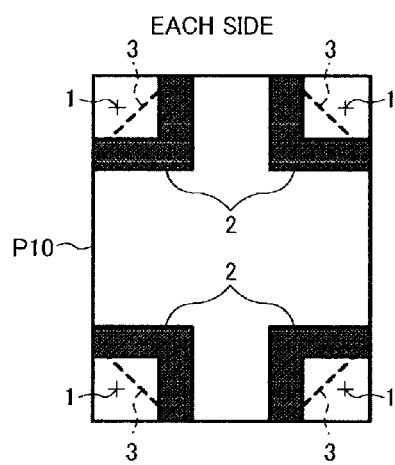
FIG. 14A is a plan view of a sheet carrying an image for adjustment on each side according to the first variation.
Figure 14B:
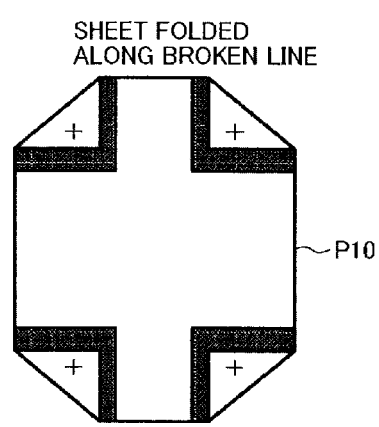
FIG. 14B is a plan view of the sheet illustrating a side to be scanned by the scanner.

FIG. 14A is a plan view of a sheet P10 carrying an image for adjustment on each side according to the first variation. FIG. 14B is a plan view of the sheet P10 illustrating a side to be scanned by the scanner 300.

In the first variation, as illustrated in FIG. 14A, the image for adjustment includes the cross-hairs 1, the corner edge detection marks 2, and the folding lines 3. The four corners of the sheet P10 are folded backward so that the scanner 300 scans positions of the cross-hairs 1 formed on a front side of the sheet P10 with respect to the corresponding corners of the sheet P10. At this time, the corner edge detection marks 1 formed on a back side of the sheet P10 are partly visible beyond the corner edges of the sheet P10. Accordingly, the corner edges of the sheet P10 and the cross-hairs 1 formed on the front side of the sheet P10 can be accurately detected. On the other hand, the four corners of the sheet P10 is folded frontward so that the scanner 300 scans positions of the cross-hairs 1 formed on the back side of the sheet P10 with respect to the corresponding corners of the sheet P10. At this time, the corner edge detection marks 1 formed on the front side of the sheet P10 are partly visible beyond the corner edges of the sheet P10. Accordingly, the corner edges of the sheet P10 and the cross-hairs 1 formed on the back side of the sheet P10 can be accurately detected.

In the first variation, the cross-hairs 1 formed in the four corners on each side of the sheet P10 can be detected by performing the scanning operation twice. By contrast, according to the comparative example as illustrated in FIG. 3, the cross-hairs 1' can be detected by performing the scanning operation four times.

Figure 15A:
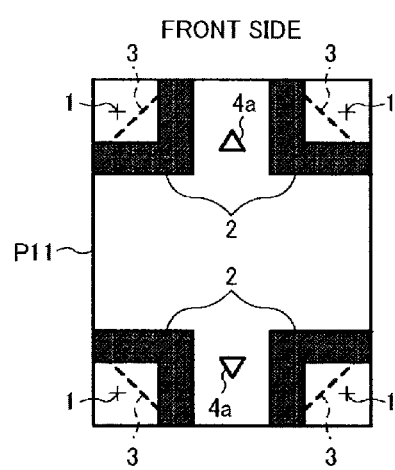
FIG. 15A is a plan view of a front side of a sheet carrying the image for adjustment of FIG. 14A that further includes one kind of identification marks.
Figure 15B:
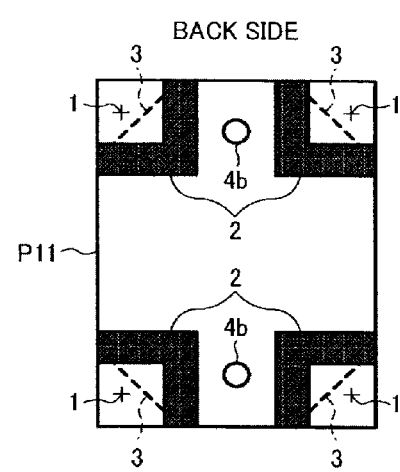
FIG. 15B is a plan view of a back side of the sheet carrying the image for adjustment of FIG. 14A that further includes another kind of identification marks.

As illustrated in FIGS. 15A and 15B, the image data for adjustment of image formation may further include different kinds of identification mark images, such as identification marks 4a and 4b, so that the scanner 300 distinguishes between front and back sides of a sheet P11. FIG. 15A is a plan view of the front side of the sheet P11 carrying the image for adjustment of FIG. 14A that further includes one kind of identification marks 4a. FIG. 15B is a plan view of the back side of the sheet P11 carrying the image for adjustment of FIG. 14A that further includes another kind of identification marks 4b. As illustrated in FIGS. 15A and 15B, the identification marks 4a are triangles whereas the identification marks 4b are circles. Such different shapes of the identification marks 4a and 4b allows the scanner 300 to distinguish between the front and back sides of the sheet P11. Alternatively, identification marks may be formed on a single side of the sheet P11 so that the scanner 300 distinguishes between the front and back sides of the sheet P11.

Figure 16:
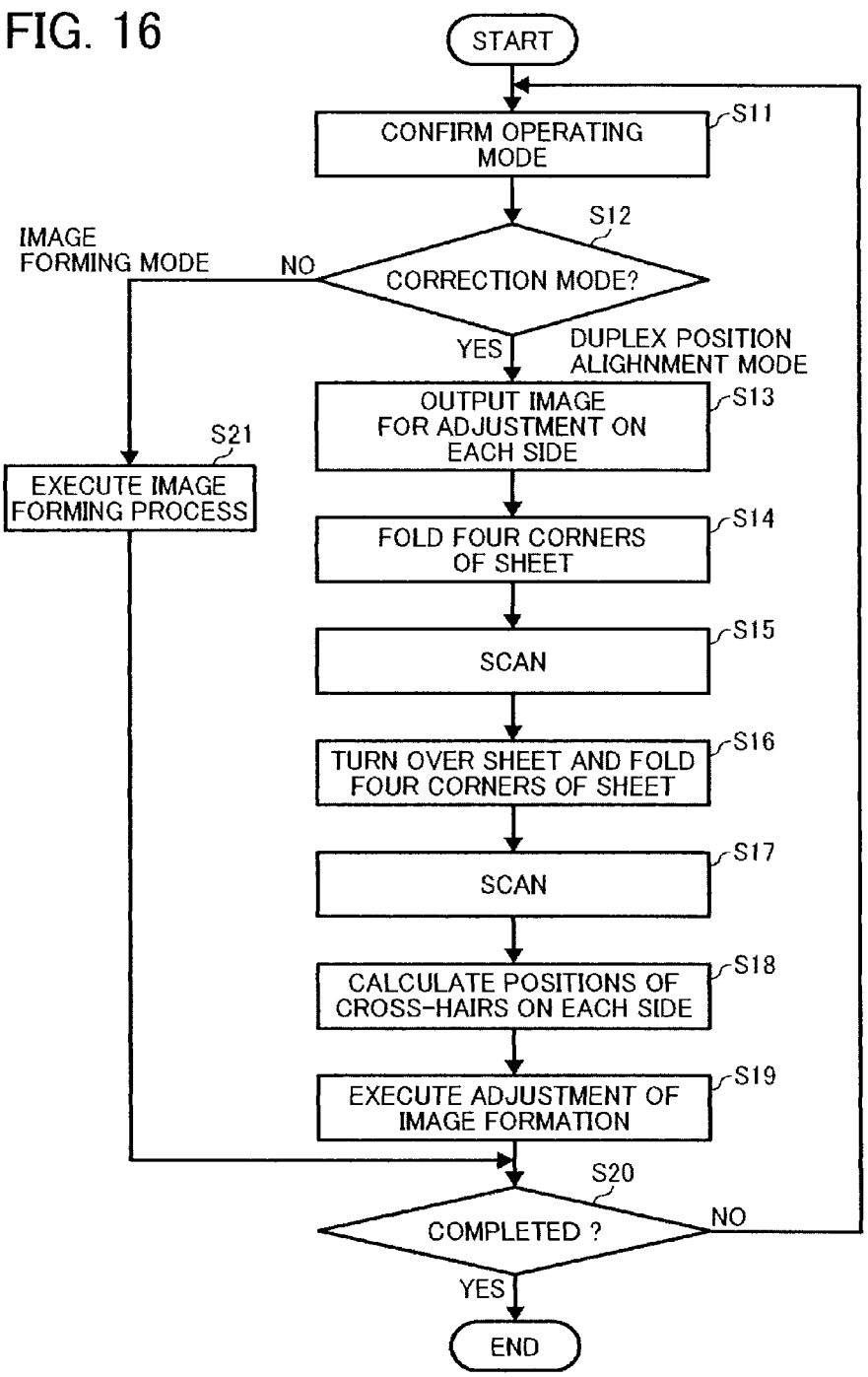
FIG. 16 is a flowchart of a control process of adjustment of image formation according to the first variation.

Referring now to FIG. 16, a description is given of a control process of adjustment of image formation according to the first variation.

FIG. 16 is a flowchart of the control process of adjustment of image formation according to the first variation.

Firstly, the control circuit 15 confirms the operating mode (S11). As in the embodiment described above, the default mode is the image forming mode. If the image forming mode is set (No in S12), the control circuit 15 executes a normal image forming process (S21). On the other hand, if an operator or user sets a correction mode through the operation device 14 of the operation panel 48 (Yes in S12) and inputs the paper size data, the tray data, or both, the control circuit 15 outputs the images for adjustment illustrated in FIGS. 14A and 14B (S13).

After the images for adjustment are outputted, the control circuit 15 displays, with the display device 18 of the operation panel 48, an instruction to fold backward the four corners of the sheet P10 along the folding lines 3 and set the folded sheet P10 on the scanner 300 (S14). According to the instruction displayed by the display device 18 of the operation panel 48, the operator or user folds backward the four corners of the sheet P10 in which the cross-hairs 1 are formed, and sets the folded sheet P10 on the scanner 300 to scan the back side of the folded sheet P10 (S15).

After the sheet P10 is scanned, the control circuit 15 displays, with the display device 18 of the operation panel 48, an instruction to fold opposite the four corners of the sheet P10 along the folding lines 3, turn over the sheet P10, and set the sheet P10 on the scanner 300 (S16). According to the instruction displayed by the display device 18 of the operation panel 48, the operator or user folds opposite the four corners of the sheet P10 in which the cross-hairs 1 are formed, turns over the sheet P10, and sets the sheet P10 on the scanner 300 to scan the front side of the folded sheet P10 (S17).

After the scanner 300 scans the sheet P10 twice, the control circuit 15 detects the cross-hairs 1 and the corner edges of the sheet P10, that is, ends of the sheet P10 in longitudinal and width directions thereof according to scan data obtained in the first scanning operation and scan data obtained in the second scanning operation. Then, the control circuit 15 calculates positions (coordinates) of the cross-hairs 1 formed on the front and back sides of the sheet P10, respectively (S18). It is to be noted that the cross-hairs 1 and the corner edges of the sheet P10, that is, the ends of the sheet P10 in the longitudinal and width directions thereof are detected as in the embodiment described above. Similarly, the positions (coordinates) of the cross-hairs 1 with respect to their respective closest corners of the sheet P10 as the origins are calculated as in the embodiment described above.

Then, the control circuit 15 executes adjustment of image formation according to the coordinates of the cross-hairs 1 thus calculated (S19). According to the first variation, the control circuit 15 corrects a magnification of the image formed on the back side of the sheet P10 as the adjustment of image formation. In addition, as in the above-described embodiment, image skew, an image position, or both may be corrected using the coordinates of the cross-hairs 1 formed on the front or back side of the sheet P10.

Correcting a magnification of an image starts with calculating a degree of magnification of an image formed on the back side of the sheet P10 relative to an image formed on the front side of the sheet P, based on the positions of the cross-hairs 1 formed on the front and back sides of the sheet P, respectively.

Specifically, the degree of magnification can be calculated based on a positional difference between the cross-hairs 1 formed on the front side of the sheet P and those formed on the back side of the sheet P.

Figure 17:
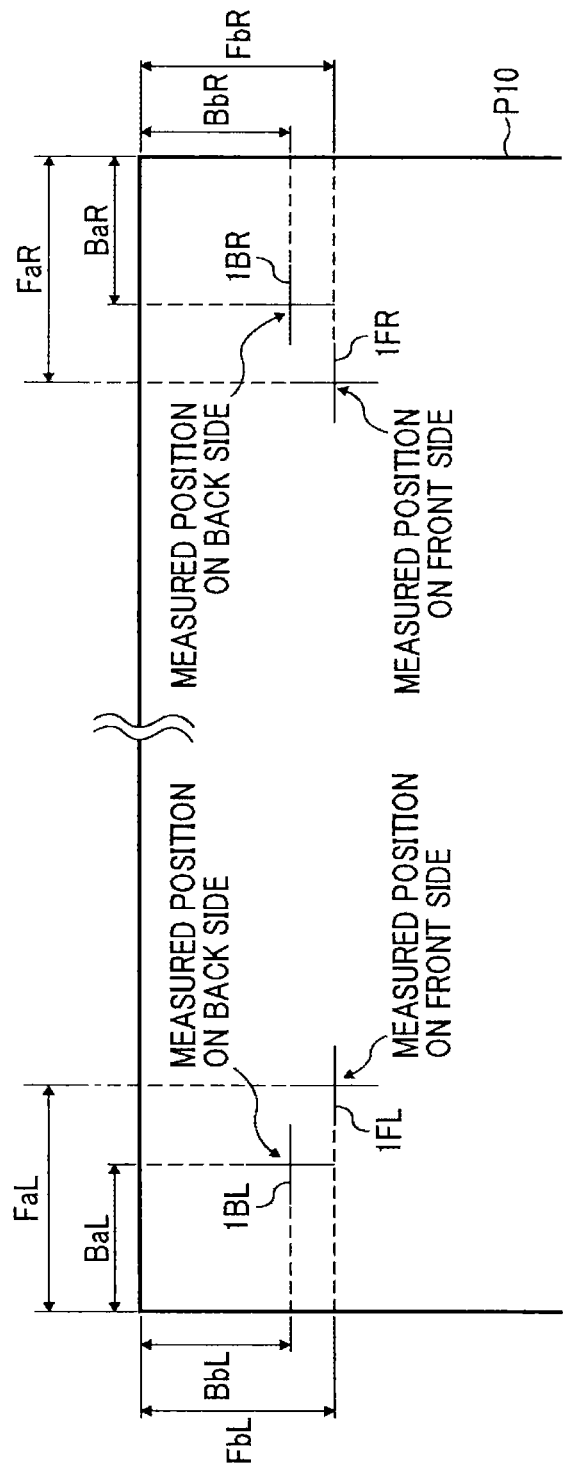
FIG. 17 is an enlarged view of the sheet illustrating a leading end thereof for describing calculation of a degree of magnification in a width direction thereof.
Figure 18:
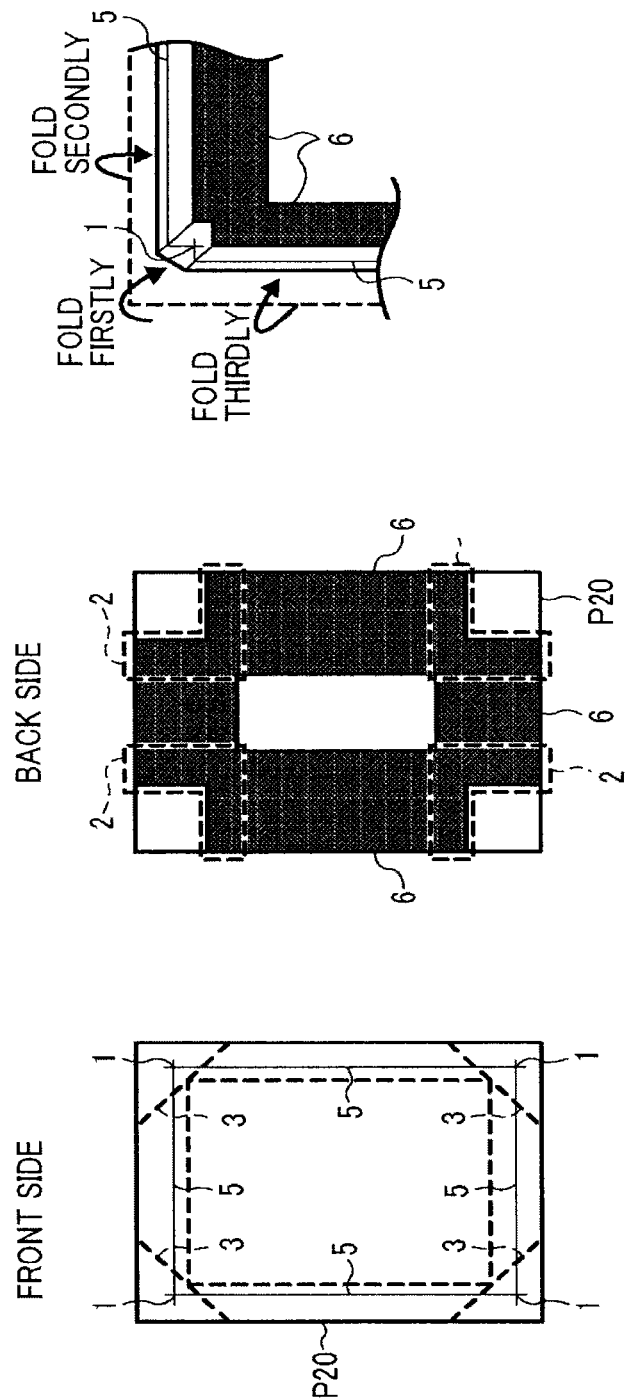
FIG. 18A is a plan view of a front side of a sheet illustrating an image for adjustment according to a second variation.
FIG. 18B is a plan view of a back side of the sheet illustrating another image for adjustment according to the second variation.
FIG. 18C is a partially enlarged view of the sheet illustrating a side to be scanned by the scanner.

Referring now to FIG. 17, a description is given of the calculation of the degree of magnification in the width direction of the sheet P10.

FIG. 17 is an enlarged view of the sheet P10 illustrating a leading end thereof for describing calculation of the degree of magnification in the width direction thereof.

Coordinates of an cross-hair 1FL formed in a left corner on a leading end, that is, a top left corner on the front side of the sheet P10 are (x1, y1) when the origin is the top left corner, where x1=FaL and y1=FbL. Coordinates of an cross-hair 1FR formed in a right corner on the leading end, that is, a top right corner on the front side of the sheet P10 are (x1, y1) when the origin is the top right corner, where x1=FaR and y1=FbR. Coordinates of a cross-hair 1BL formed in the top left corner on the back side of the sheet P10 are (x'1, y'1) when the origin is the top left corner, where x'1=BaL and y'1=BbL. Coordinates of a cross-hair 1 BR formed in the top right corner on the back side of the sheet P10 are (x'1, y'1) when the origin is the top right corner, where x'1=BaR and y'1=BbR. As described above, generally, a toner image formed on a front side of a sheet shrinks slightly when it is fixed onto the sheet because the sheet shrinks slightly during the fixing operation. In other words, the image formed on the front side of the sheet is smaller than an image formed on the back side of the sheet. Accordingly, a degree of magnification MW, that is, an amount of compression between the front and back sides of the sheet P10 in the width direction thereof (main scanning direction) can be expressed in an equation MW=(BaL+BaR)/(FaL+FaR).

Similarly, a degree of magnification ML, that is, an amount of compression between the front and back sides of the sheet P10 in the longitudinal direction thereof (sub-scanning direction) can be expressed in an equation ML=(BbL+BbR)/(FbL+FbR).

After calculating the degree of magnification MW in the width direction of the sheet P10 and the degree of magnification ML in the longitudinal direction thereof, the control circuit 15 displays calculated data with the display device 18 of the operation panel 48. According to the calculated data displayed by the display device 18, the operator or user operates the operation device 14 to input vertical and horizontal magnifications of the back side of the sheet P10. For example, the operator or user inputs a magnification of 0.98 of the back side of the sheet P10 relative to the front side thereof. Instead of inputting a magnification as described above, the image forming apparatus 400 may automatically correct the degree of magnification.

Now, a description is given of correction of the degree of magnification.

The degree of magnification is corrected by correcting a writing start position for forming an image on the back side of the sheet P10 while removing dots according to a predetermined algorithm from image data for forming an image on the back side of the sheet P10 (hereinafter referred to as back side image data). Specifically, the writing start timing from the main scanning sync signal is corrected according to (BaL−FaL) whereas the writing start timing from the sub-scanning sync signal is corrected according to (BbL−FbL). The number of dots to be removed along the main scanning direction from the back side image data is calculated according to the horizontal magnification inputted by the operator or user. The calculated number of dots are removed from the back side image data according to the predetermined algorithm. Accordingly, the horizontal magnification of a back side image, that is, image to be formed on the back side of the sheet P10 is slightly compressed. In addition, the number of images to be removed along the main scanning direction from the back side image data is calculated according to the vertical magnification inputted. For example, if the number of images thus calculated corresponds to two scans, two scans of images are removed along the main scanning direction from the back side image data. Accordingly, the vertical magnification of the back side image is slightly compressed.

It is to be noted that, if the writing start timing is corrected according to the positions of the cross-hairs 1 formed on the front side of the sheet P10 and their target positions, the writing timing of the back side image is corrected taking into account the corrected amount. As described above, the magnification error between the front and back sides of the sheet P10 is corrected by slightly compressing the back side image. Alternatively, the magnification error between the front and back sides of the sheet P10 may be corrected by slightly enlarging a front side image, that is, image to be formed on the front side of the sheet P10.

Alternatively, magnification errors between the measured position and the target position may be calculated and corrected for each of the front and back side images. In such a case, if coordinates of a target position are (x0=A, y0=B), the following relations are satisfied:

$$MW=((A-aL)+(A-aR))/H0;\text{ and}$$

$$ML=((B-bL)+(B-bL'))/L0,$$

where each of H0 and L0 is a distance between the target positions, and bL' is a position of a cross-hair formed in a left corner on a trailing end of the sheet P from the left corner of the trailing end of the sheet P in the longitudinal direction thereof. A relation of H0=W−2A is satisfied, where W represents the width of the sheet P10. A relation of L0=L−2B is satisfied, where L represents the length of the sheet P10.

Referring now to FIGS. 18A through 26, a description is given of a second variation of the above-described embodiment.

FIG. 18A is a plan view of a front side of a sheet P20 illustrating an image for adjustment according to the second variation. FIG. 18B is a plan view of a back side of the sheet P20 illustrating another image for adjustment according to the second variation. FIG. 18C is a partially enlarged view of the sheet P20 illustrating a side to be scanned by the scanner 300.

Unlike the first variation, the images for adjustment of the second variation include a frame 5 and an edge detection mark 6. Specifically, as illustrated in FIG. 18A, the frame 5 is formed on the front side of the sheet P20 in addition to the cross-hairs 1 formed in four corners of the sheet P20. As illustrated in FIG. 18B, an edge detection mark 6 is formed on the back side of the sheet P20 to detect edges of the sheet P20, in addition to the corner edge detection marks 2.

Upon setting the sheet P20 carrying the images for adjustment on the scanner 300, firstly, the four corners of the sheet P20 are folded backward along the folding lines 3, as in the first variation described above. Then, all edges of the sheet P20 is folded backward so that the frame 5 is visible on the back side thereof. As a result, each of the four corners of the sheet P20 that is scanned is like a corner illustrated in FIG. 18C.

According to the second variation, the edge detection mark 6 is partly visible beyond the edges of the sheet P20 folded backward, thereby generating a contrast between the edge detection mark 6 and the edges of the sheet P20. Accordingly, a positional relation between the frame 5 and the edges of the sheet P20 can be acknowledged from scan data obtained from the scanner 300, thereby detecting an image deformation such as an image 1100 deformed on a sheet P21 illustrated in FIG. 19.

Referring now to FIG. 20, a description is given of a control process of adjustment of image formation according to the second variation.

FIG. 20 is a flowchart of the control process of adjustment of image formation according to the second variation.

Firstly, the control circuit 15 confirms the operating mode (S31). As in the embodiment described above, the default mode is the image forming mode. If the image forming mode is set (No in S32), the control circuit 15 executes a normal image forming process (S41). On the other hand, if an operator or user sets a correction mode through the operation device 14 of the operation panel 48 (Yes in S32) and inputs the paper size data, the tray data, or both, the control circuit 15 outputs the images for adjustment illustrated in FIGS. 18A and 18B (S33).

After the images for adjustment are outputted, the control circuit 15 displays, with the display device 18 of the operation panel 48, an instruction to fold the four corners of the sheet P20 along the folding lines 3, then fold all the edges (i.e., sides) of the sheet P20, and set the folded sheet P20 on the scanner 300 (S34). According to the instruction displayed by the display device 18 of the operation panel 48, the operator or user folds the sheet P20 carrying the images for adjustment, and sets the folded sheet P20 on the scanner 300 to scan the folded sheet P20 carrying the images for adjustment (S35).

After the scanner 300 scans the folded sheet P20 carrying the images for adjustment, the control circuit 15 detects the cross-hairs 1, the frame 5, the edges of the sheet P20, and the corner edges of the sheet P20, that is, ends in each corner of the sheet P20 in the longitudinal and width directions thereof, respectively (S36). Then, the control circuit 15 calculates positions (coordinates) of the cross-hairs 1 from their respective origins, that is, closest corners (S37). The control circuit 15 also calculates the position of the frame 5 from the edges of the sheet P20 (S38).

Then, the control circuit 15 executes an image correction (S39). In the second variation, the control circuit 15 corrects an image position and image skew according to the coordinates of the cross-hairs 1 thus calculated. In addition, the control circuit 15 corrects an image deformation according to the position of the frame 5. The image position and the image skew are corrected as in the above-described embodiment.

Figure 19:
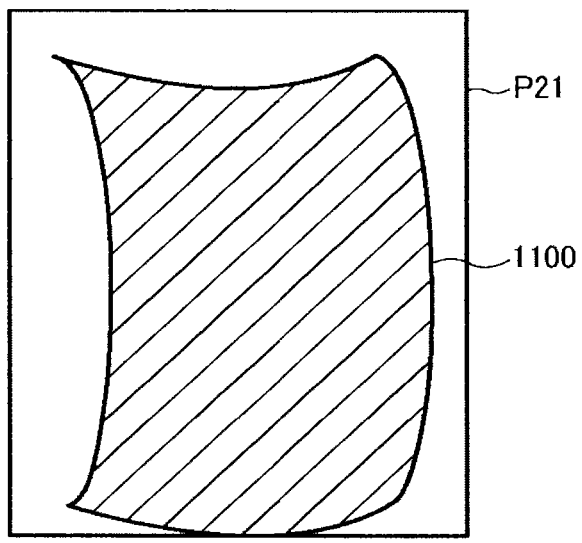
FIG. 19 is a plan view of a sheet carrying a deformed image thereon.
Figure 21A:
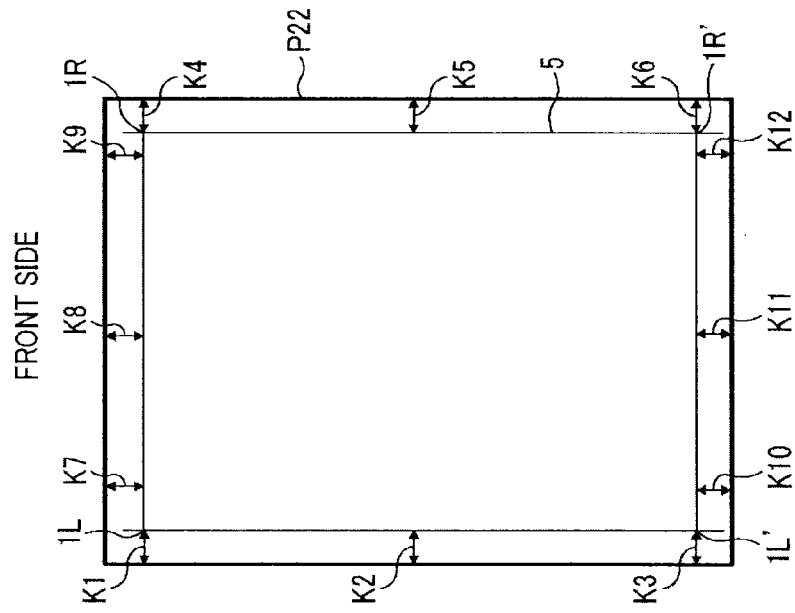
FIG. 21A is a plan view of a back side of a sheet for describing distances between a frame and ends of the sheet, and distances between cross-hairs and the ends of the sheet when an image is deformed on the sheet as illustrated in FIG. 19.
Figure 21B:
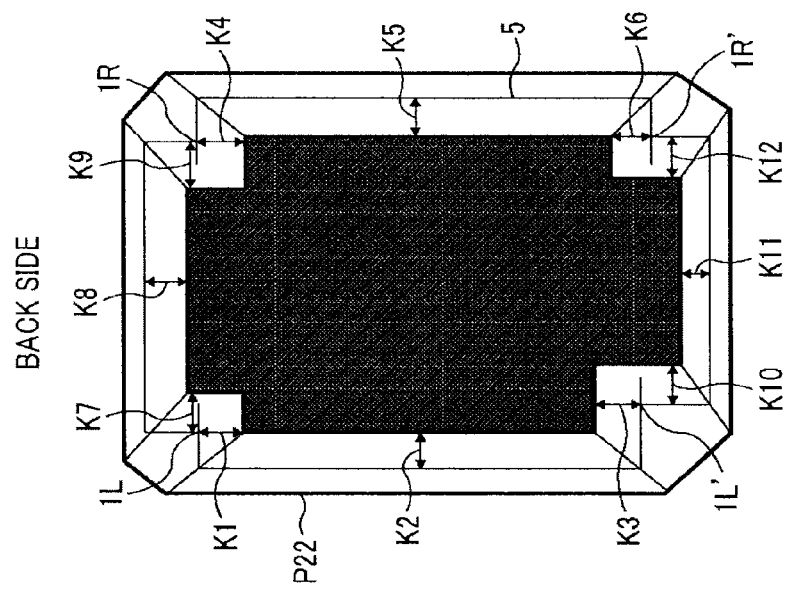
FIG. 21B is a plan view of a front side of the sheet for describing distances between the frame and the ends of the sheet, and distances between the cross-hairs and the ends of the sheet when the image is deformed on the sheet as illustrated in FIG. 19.

Referring now to FIGS. 21A through 26, a description is given of the correction of image deformation. FIG. 21A is a plan view of a back side of a sheet P22 for describing distances between the frame 5 and the ends of the sheet P22, and distances between the cross-hairs 1 and the ends of the sheet P22 when an image is deformed on the sheet P22 as illustrated in FIG. 19. FIG. 21B is a plan view of a front side of the sheet P22 for describing distances between the frame 5 and the ends of the sheet P22, and distances between the cross-hairs 1 and the ends of the sheet P22 when the image is deformed on the sheet P22 as illustrated in FIG. 19.

For example, when an image is deformed on the sheet P22, such as the image 1100 illustrated in FIG. 19, a distance K2 is longer than distances K1 and K3. The distance K1 is a distance between a left end of the sheet P22 and the cross-hair 1L formed in a top left corner of the sheet P22. The distance K2 is a distance between the left end of the sheet P22 and a center of the frame in a vertical direction thereof. The distance K3 is a distance between the left end of the sheet P22 and an cross-hair 1L' formed in a bottom left corner of the sheet P22. On the other hand, a distance K5 is shorter than distances K4 and K6. The distance K4 is a distance between a right end of the sheet P22 and the cross-hair 1R formed in a top right corner of the sheet P22. The distance K5 is a distance between the right end of the sheet P22 and a center of the frame in the vertical direction thereof. The distance K6 is a distance between the right end of the sheet P22 and a cross-hair 1R' formed in a bottom right corner of the sheet P22. By such positional relations, the control circuit 15 detects an image deformation in the sub-scanning direction as illustrated in FIG. 19. If an image is skewed, an amount of image skew is deducted upon calculation of the distances K2, K3, K5, and K6. Accordingly, an image deformation in the main scanning direction can be calculated that may not be acknowledged only by forming the cross-hairs 1L, 1R, 1L' and 1R' in the four corners of the sheet P22, respectively. It is to be noted that the image deformation may not be like the image 1100 illustrated in FIG. 19 in which the center of the image 1100 is recessed most. For example, the image may be recessed most in an upper portion thereof or the image may be deformed as a wave. With the frame 5, the distances between the frame 5 and the ends of the sheet P20 can be detected. Accordingly, any types of image deformation can be accurately detected.

Image deformation in the main scanning direction is corrected by adjusting the writing start timing in the main scanning direction at each position in the sub-scanning direction, that is, the longitudinal direction of the sheet P2, according to the distance between the frame 5 and an end of the sheet P20 at each position in the sub-scanning direction.

A distance K8 is longer than distances K7 and K9. The distance K7 is a distance between a top end of the sheet P22 and the cross-hair 1L. The distance K8 is a distance between the top end of the sheet P22 and a center of the frame in a horizontal direction thereof. The distance K9 is a distance between the top end the sheet P22 and the cross-hair 1R. On the other hand, a distance K11 is shorter than distances K10 and K12. The distance K10 is a distance between a bottom end of the sheet P22 and the cross-hair 1L'. The distance K11 is a distance between the bottom end of the sheet P22 and a center of the frame in the horizontal direction thereof. The distance K12 is a distance between the bottom end of the sheet P22 and the cross-hair 1R'. By such positional relations, the control circuit 15 detects an image deformation in the sub-scanning direction as illustrated in FIG. 19. If an image is skewed, an amount of image skew is deducted upon calculation of the distances K8, K9, K11, and K12. Accordingly, an image deformation in the sub-scanning direction can be calculated that may not be detected only by forming the crosshairs 1L, 1R, 1L' and 1R' in the four corners of the sheet P22, respectively.

Generally, deformation or curvature of an image in the sub-scanning direction results from curvature of a scanned line of laser light directed onto a photoconductor from a writer due to slight deformation of optical components such as a lens or mirror of the writer by, e.g., machining errors.

Figure 22:
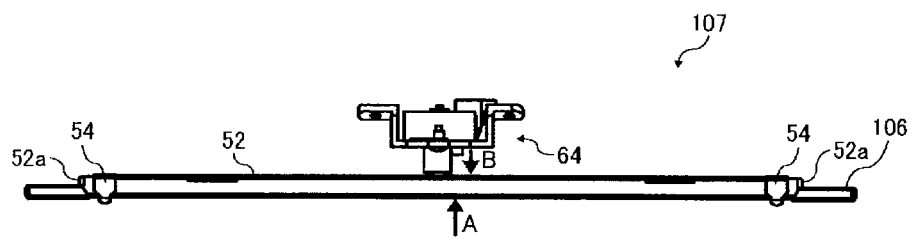
FIG. 22 is a schematic view of a mechanism for correcting deformation of an image in a sub-scanning direction.

Referring now to FIG. 22, a description is given of a mechanism for correcting deformation of an image in the sub-scanning direction (hereinafter simply referred to as deformation correction mechanism 107).

FIG. 22 is a schematic view of the deformation correction mechanism 107 incorporated in the writer 102.

As illustrated in FIG. 22, a holder 52 holds the mirror 106 from behind, that is, a non-specular side of the mirror 106.

A protrusion 52a serving as a supporter is provided at each end of the holder 52 in a longitudinal direction thereof and protrudes toward the reflection mirror 106. The protrusions 52a contact a back side, that is, the non-specular side of the mirror 106. A flat spring 54 serving as a first bender is attached to the holder 52 inward from each protrusion 52a in the longitudinal direction thereof. Each flat spring 54 presses the reflection mirror 106 in a direction indicated by arrow A, from a specular side to the back side of the reflection mirror 106. Accordingly, the reflection mirror 106 is bent at the center in the longitudinal direction thereof from the specular side to the back side thereof. In other words, the reflection mirror 106 is held by the holder 52 while being bent by the flat spring 54. A pressing device 64 serving as a second bender is disposed behind the holder 52 to press, via the holder 52, the center of the reflection mirror 106 in the longitudinal direction thereof in a direction indicated by arrow B, which is opposite a direction in which the holder 52 is bent.

Figure 23:
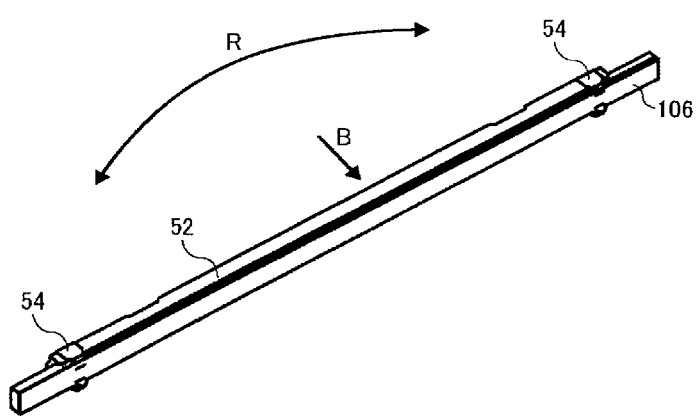
FIG. 23 is a schematic perspective view of a reflection mirror illustrated in FIG. 22 that is bent.
Figure 24:
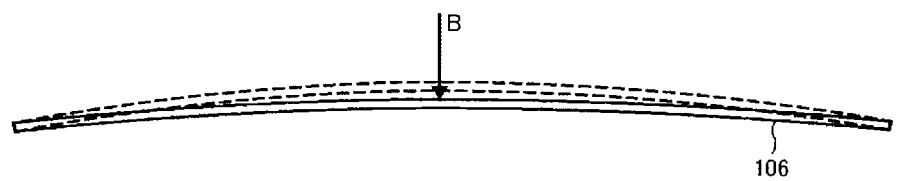
FIG. 24 is the reflection mirror of FIG. 23 slightly pressed in a direction opposite a direction in which the reflection mirror is curved by a pressing device of the skew correction mechanism of FIG. 22.
Figure 25:
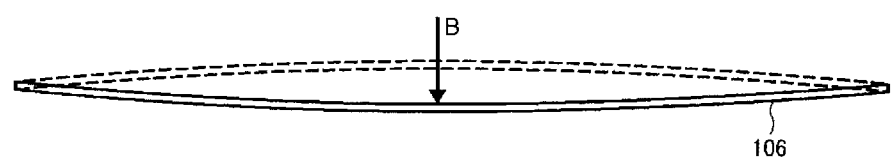
FIG. 25 is the reflection mirror of FIG. 24 further pressed by the pressing device.

FIG. 23 is a schematic perspective view of the reflection mirror 106 bent by the flat spring 54. In an initial state, that is, when the pressing device 64 does not press the reflection mirror 106, the reflection mirror 106 is bent in directions indicated by arrow R, from the specular side to the back side thereof. When the pressing device 64 slightly presses the reflection mirror 106 in the initial state in the direction indicated by arrow B, the reflection mirror 106 is bent in the direction opposite the direction in which the reflection mirror 106 is bent by the flat spring 54. Accordingly, as illustrated in FIG. 24, an amount of curvature of the reflection mirror 106 is reduced. When the pressing device 64 further presses the reflection mirror 106, as illustrated in FIG. 24, the reflection mirror 106 is bent in a direction opposite the direction in which the reflection mirror 106 is bent in the initial state. Thus, the reflection mirror 106 can be bent either to the back side or the specular side thereof. Accordingly, as illustrated in FIG. 26, curvature of a main scanned line Lb indicated by a solid line and a main scanned line Lc indicated by a chain line can be corrected.

Figure 26:
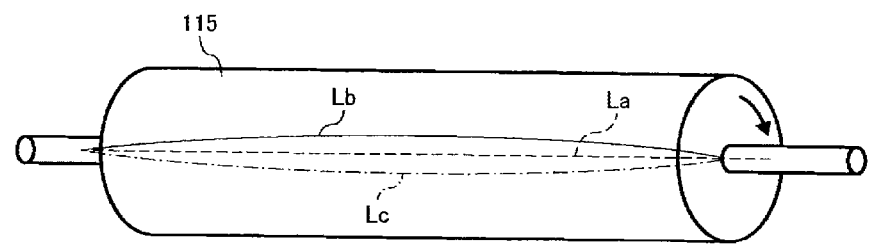
FIG. 26 is a perspective view of a photoconductive drum with main scanned lines on a surface thereof.

By controlling the pressing device 64 according to an amount of deformation in the sub-scanning direction calculated based on the distances between the frame 5 and the ends of the sheet P22, a main scanned line that is bent can be corrected to be a straight main scanned line La indicated by a broken line in FIG. 26. Accordingly, image deformation in the sub-scanning direction is corrected.

The above-description is given of an embodiment of the present invention. The present invention provides advantages specific to the individual aspects described below.

According to a first aspect, a non-transitory computer-readable storage medium (e.g., storage 12) stores image data for adjustment of image formation. The image data is read from the non-transitory computer-readable storage medium to form an image for adjustment on a recording medium (e.g., sheet P) when image formation is adjusted in the image forming apparatus, more specifically, when at least one of a series of image forming processes including conveyance of the recording medium to an imaging device (e.g., imaging unit 125) is adjusted. The image data includes a cross-hair (e.g., cross-hair 1) formed in a corner of the recording medium and a corner edge detection mark (e.g., corner edge detection mark 2) formed to detect a folded corner edge of the recording medium from read data obtained when the corner of the recording medium including an area where the cross-hair is formed on one side is folded to an opposite side to the one side of the recording medium and an image reader (e.g., scanner 300) reads the opposite side. In short, the image forming apparatus forms the cross-hair and the corner edge detection mark on the recording medium. As described above, when the corner of the recording medium including the area where the cross-hair is formed is folded to the opposite side and the image reader read the opposite side, the corner edge detection mark allows the folded corner edge of the recording medium to be detected from the read data.

Accordingly, to read the cross-hair and the corner edge of the recording medium with the image reader, an operator or user simply folds the corner of the recording medium including the area where the cross-hair is formed and sets the folded recording medium on the image reader. Thus, image adjustment is simplified compared to a comparative example of scanning the cross-hair and the corner edge of the recording medium using an auxiliary member, which is looked for or outputted by the image forming apparatus and set on the image reader such that the auxiliary member is partly visible beyond the recording medium set on the image reader. In addition, if the operator adjusts image formation, the operator is free from carrying the auxiliary member every time the operator adjusts image formation.

As described above, according to the first aspect, the image reader can read the cross-hair and the corner edge of the recording medium. Accordingly, the distance between the cross-hair and the corner edge of the recording medium can be accurately calculated, and advantages of the above-described comparative example can be also secured.

According to a second aspect, the corner edge detection mark generates a contrast between the folded corner edge and the opposite side of the recording medium.

Accordingly, as in the embodiment described above, the corner edge of the recording medium can be accurately detected.

According to a third aspect, the cross-hair is formed in each corner of the recording medium, and the corner edge detection mark is formed on the opposite side of the recording medium at a position where, when the corner of the recording medium is folded such that the cross-hair and the corner edge are positioned in an image read range of the image reader, the folded corner edge of the recording medium is positioned.

Accordingly, as in the embodiment described above, even if the recording medium carrying the image for adjustment of image formation is larger than a maximum scan size, each corner of the recording medium and the cross-hair formed therein can be detected in a scanning operation. Thus, the image adjustment is simplified compared to the comparative example of scanning the four corners of the recording medium and the cross-hairs formed in the four corners of the recording medium by performing the scanning operation twice.

According to a fourth aspect, the cross-hair and the corner edge detection mark are formed on a front side and a back side of the recording medium.

Accordingly, as in the first variation described above, a degree of magnification of an image formed on a back side of the recording medium can be detected with respect to an image formed on a front side of the recording medium.

According to a fifth aspect, the image data of the fourth aspect further includes an identification mark (e.g., identification mark 4a or 4b) to distinguish between the front side and the back side of the recording medium.

Accordingly, the front and back sides of the recording medium can be distinguished, even though the recording medium carries the cross-hair and corner edge detection mark on each side.

According to a sixth aspect, the image data further includes a frame (e.g., frame 5), and an edge detection mark (e.g., edge detection mark 6) formed to detect a folded edge of the recording medium from read data provided obtained when the edge of the recording medium including an area where the frame is formed on the one side is folded to the opposite side and the image reader reads the opposite side.

Accordingly, image deformation can be detected as in the second variation described above.

According to a seventh aspect, an image forming apparatus (e.g., image forming apparatus 400) includes an image forming device (e.g., printer 100) to form an image on a recording medium, an image reader (e.g., scanner 300) to read an image from a recording medium (e.g., sheet P), a non-transitory computer-readable storage medium (e.g., storage 12) to store image data for adjustment of image formation. The image data includes a cross-hair (e.g., cross-hair 1) formed in a corner of a recording medium. The image forming apparatus further includes an adjuster (e.g., control circuit 15) to read the image data from the non-transitory computer-readable storage medium, to form an image for adjustment of image formation on a recording medium with the image forming device, to read the image for adjustment of image formation formed from the recording medium with the image reader, and to adjust image formation according to read data provided by the image reader. When the corner of the recording medium including an area where the cross-hair is formed on one side is folded to an opposite side to the one side of the recording medium, the adjuster reads the opposite side with the image reader, detects the cross-hair and a corner edge of the recording medium from read data provided by the image reader, calculates a distance between the cross-hair and the corner edge of the recording medium, and adjusts the image formation according to the distance between the cross-hair and the corner edge of the recording medium.

According to the seventh aspect, for example, a recording medium having front and back sides differently colored is used to form the cross-hair thereon. Thus, the adjustment of the image forming apparatus is simplified compared to an image forming apparatus employing the comparative example that requires a recording medium to form the cross-hair thereon and the auxiliary member.

Moreover, according to the seventh aspect, the cross-hair and the corner edge of the recording medium are detected from the read data. Accordingly, the distance between the cross-hair and the corner edge of the recording medium can be accurately detected, and the image formation can be accurately adjusted.

According to an eighth aspect, in the image forming apparatus of the seventh aspect, the image data further includes a corner edge detection mark formed to detect a folded corner edge of the recording medium from the read data obtained when the corner of the recording medium including the area where the cross-hair is formed on the one side is folded to the opposite side to the one side of the recording medium and the image reader reads the opposite side.

Since the image forming apparatus outputs the recording medium carrying the cross-hair and the corner edge detection mark, use of a recording medium having front and back sides colored differently can be omitted, thereby simplifying the adjustment of image formation.

According to a ninth aspect, in the image forming apparatus of the seventh aspect, the adjuster detects a difference between a position of an image and a target image forming position according to the distance between the cross-hair and the corner edge of the recording medium, and adjusts the image formation such that the image is formed at the target image forming position.

Accordingly, an image can be formed at a target position.

According to a tenth aspect, in the image forming apparatus of the seventh aspect, the cross-hair is formed in each corner on one end of the recording medium in a longitudinal direction of the recording medium. The adjuster detects an amount of image skew with respect to the recording medium according to a distance between the one end of the recording medium in the longitudinal direction and the cross-hair formed on one end of the recording medium in a lateral direction of the recording medium, and a distance between the one end of the recording medium in the longitudinal direction and the cross-hair formed on another end of the recording medium in the lateral direction, and adjusts the image formation to correct the image skew.

Accordingly, an image can be formed on a recording medium without being skewed.

According to an eleventh aspect, in the image forming apparatus of the seventh aspect, the image data further includes a corner edge detection mark formed to detect a folded corner edge of the recording medium from the read data obtained when the corner of the recording medium including the area where the cross-hair is formed on the one side is folded to the opposite side to the one side of the recording medium and the image reader reads the opposite side. The cross-hair and the corner edge detection mark are formed on a front side and a back side of the recording medium. The adjuster detects a difference between a position of an image formed on the front side of the recording medium and a position of an image formed on the back side of the recording medium according to a front side read data provided by the image reader when the image reader reads the back side of the recording medium after the corner of the recording medium including an area where the cross-hair is formed on the front side of the recording medium is folded to the back side of the recording medium, and according to a back side read data provided by the image reader when the image reader reads the front side of the recording medium after the corner of the recording medium including an area where the cross-hair is formed on the back side of the recording medium is folded to the front side of the recording medium. The adjuster adjusts the image formation such that the position of the image formed on the front side of the recording medium and the position of the image formed on the back side of the recording medium match each other.

Accordingly, as in the first variation described above, the image can be outputted on each side of the recording medium while the position of the image formed on the front side of the recording medium and the position of the image formed on the back side of the recording medium match each other.

According to a twelfth aspect, in the image forming apparatus of the seventh aspect, the image data further includes a corner edge detection mark, a frame, and an edge detection mark. The corner edge detection mark is formed to detect a folded corner edge of the recording medium from the read data obtained when the corner of the recording medium including the area where the cross-hair is formed on the one side is folded to the opposite side and the image reader reads the opposite side. The edge detection mark is formed to detect a folded edge of the recording medium from read data obtained when the edge of the recording medium including an area where the frame is formed on the one side is folded to the opposite side and the image reader reads the opposite side. When the edge of the recording medium including the area where the frame is formed on the one side is folded to the opposite side, the adjuster reads the opposite side with the image reader, calculates a distance between the frame and the edge of the recording medium from read data provided by the image reader, detects an image deformation according to the distance between the frame and the edge of the recording medium, and adjusts the image formation to correct the image deformation.

As in the second variation described above, an image deformation can be corrected by detecting the distance between the frame and the edge of the recording medium. Accordingly, a reliable image can be outputted without causing an image deformation.

According to a thirteenth aspect, a method of adjusting image formation of an image forming apparatus (e.g., image forming apparatus 400) includes forming a cross-hair (e.g., cross-hair 1) in a corner of a recording medium (sheet P), folding the corner of the recording medium including an area where the cross-hair is formed on one side, to an opposite side of the recording medium, reading the opposite side with an image reader (e.g., scanner 300), detecting the cross-hair and a corner edge of the recording medium according to read data provided by the image reader to calculate a distance between the cross-hair and the corner edge of the recording medium, and adjusting image formation of the image forming apparatus according to the distance between the cross-hair and the corner edge of the recording medium.

According to the thirteenth aspect, for example, a recording medium having front and back sides differently colored is used to form the cross-hair thereon. Thus, the adjustment of the image forming apparatus is simplified compared to an image forming apparatus employing the comparative example that requires a recording medium to form the cross-hair thereon and the auxiliary member.

Moreover, according to the thirteenth aspect, the cross-hair and the corner edge of the recording medium are detected from the read data. Accordingly, the distance between the cross-hair and the corner edge of the recording medium can be accurately detected, and the image formation can be accurately adjusted.

Numerous additional modifications and variations are possible in light of the above teachings. It is therefore to be understood that within the scope of the appended claims, the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of the present invention and appended claims.

Further, any of the above-described devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

What is claimed is:

1. A non-transitory computer-readable storage medium storing image data for adjustment of image formation and comprising instructions for:
retrieving a cross-hair from the storage medium to form the cross hair in a corner of a recording medium; and
retrieving a corner edge detection mark from the storage medium to form the mark on the recording medium to detect a folded corner edge of the recording medium from read data obtained when the corner of the recording medium including an area where the cross-hair is formed on one side is folded to an opposite side to the one side of the recording medium and an image reader reads the opposite side.

2. The storage medium according to claim 1, wherein the corner edge detection mark generates a contrast between the folded corner edge and the opposite side of the recording medium.

3. The storage medium according to claim 1, wherein the cross-hair is formed in each corner of the recording medium, and the corner edge detection mark is formed on the opposite side of the recording medium at a position where, when the corner of the recording medium is folded such that the cross-hair and the corner edge are positioned in an image read range of the image reader, the folded corner edge of the recording medium is positioned.

4. The storage medium according to claim 1, wherein the cross-hair and the corner edge detection mark are formed on a front side and a back side of the recording medium.

5. The storage medium according to claim 4, wherein the image data further comprises an identification mark to distinguish between the front side and the back side of the recording medium.

6. The storage medium according to claim 1, wherein the image data further comprises:
a frame; and
an edge detection mark formed to detect a folded edge of the recording medium from read data obtained when the edge of the recording medium including an area where the frame is formed on the one side is folded to the opposite side and the image reader reads the opposite side.

7. An image forming apparatus comprising:
an image forming device to form an image on a recording medium;
an image reader to read an image from a recording medium;

a non-transitory computer-readable storage medium to store image data for adjustment of image formation, the image data comprising a cross-hair formed in a corner of a recording medium; and an adjuster to read the image data from the non-transitory computer-readable storage medium, to form an image for adjustment of image formation on a recording medium with the image forming device, to read the image for adjustment of image formation from the recording medium with the image reader, and to adjust image formation according to read data provided by the image reader, wherein, when the corner of the recording medium including an area where the cross-hair is formed on one side is folded to an opposite side to the one side of the recording medium, the adjuster reads the opposite side with the image reader, detects the cross-hair and a corner edge of the recording medium from read data provided by the image reader, calculates a distance between the cross-hair and the corner edge of the recording medium, and adjusts the image formation according to the distance between the cross-hair and the corner edge of the recording medium.

8. The image forming apparatus according to claim 7, wherein the image data further comprises a corner edge detection mark formed to detect a folded corner edge of the recording medium from the read data obtained when the corner of the recording medium including the area where the cross-hair is formed on the one side is folded to the opposite side and the image reader reads the opposite side.

9. The image forming apparatus according to claim 7, wherein the adjuster detects a difference between a position of an image and a target image forming position according to the distance between the cross-hair and the corner edge of the recording medium, and adjusts the image formation such that the image is formed at the target image forming position.

10. The image forming apparatus according to claim 7,
wherein the cross-hair is formed in each corner on one end of the recording medium in a longitudinal direction of the recording medium, and wherein the adjuster detects an amount of image skew with respect to the recording medium according to a distance between the one end of the recording medium in the longitudinal direction and the cross-hair formed on one end of the recording medium in a lateral direction of the recording medium, and a distance between the one end of the recording medium in the longitudinal direction and the cross-hair formed on another end of the recording medium in the lateral direction, and adjusts the image formation to correct the image skew.

11. The image forming apparatus according to claim 7,
wherein the image data further comprises a corner edge detection mark formed to detect a folded corner edge of the recording medium from the read data obtained when the corner of the recording medium including the area where the cross-hair is formed on the one side is folded to the opposite side and the image reader reads the opposite side, wherein the cross-hair and the corner edge detection mark are formed on a front side and a back side of the recording medium, and wherein the adjuster detects a difference between a position of an image formed on the front side of the recording medium and a position of an image formed on the back side of the recording medium according to a front side read data provided by the image reader when the image reader reads the back side of the recording medium after the corner of the recording medium including an area where the cross-hair is formed on the front side of the recording medium is folded to the back side of the recording medium, and according to a back side read data provided by the image reader when the image reader reads the front side of the recording medium after the corner of the recording medium including an area where the cross-hair is formed on the back side of the recording medium is folded to the front side of the recording medium, and the adjuster adjusts the image formation such that the position of the image formed on the front side of the recording medium and the position of the image formed on the back side of the recording medium match each other.

12. The image forming apparatus according to claim 7,
wherein the image data further comprises:

a corner edge detection mark formed to detect a folded corner edge of the recording medium from the read data obtained when the corner of the recording medium including the area where the cross-hair is formed on the one side is folded to the opposite side and the image reader reads the opposite side;

a frame; and an edge detection mark formed to detect a folded edge of the recording medium from read data obtained when the edge of the recording medium including an area where the frame is formed on the one side is folded to the opposite side and the image reader reads the opposite side, and wherein when the edge of the recording medium including the area where the frame is formed on the one side is folded to the opposite side, the adjuster reads the opposite side with the image reader, calculates a distance between the frame and the edge of the recording medium from read data provided by the image reader, detects an image deformation according to the distance between the frame and the edge of the recording medium, and adjusts the image formation to correct the image deformation.

13. A method of adjusting image formation of an image forming apparatus, the method comprising:

forming a cross-hair in a corner of a recording medium;

folding the corner of the recording medium including an area where the cross-hair is formed on one side, to an opposite side to the one side of the recording medium;

reading the opposite side with an image reader;

detecting the cross-hair and a corner edge of the recording medium according to read data provided by the image reader to calculate a distance between the cross-hair and the corner edge of the recording medium; and adjusting image formation of the image forming apparatus according to the distance between the cross-hair and the corner edge of the recording medium.

* * * * *